US011926418B2

(12) United States Patent
Lu et al.

(10) Patent No.: US 11,926,418 B2
(45) Date of Patent: Mar. 12, 2024

(54) WINCH DELIVERY SYSTEM

(71) Applicant: FLYBY ROBOTICS, INC., Los Angeles, CA (US)

(72) Inventors: Jason Huishen Lu, Los Angeles, CA (US); Xuan-Truc Nguyen, Los Angeles, CA (US); Gursimran Bains, Los Angeles, CA (US); Ryan Des Cotes, Nepean (CA); Joseph Luc Boucher, Ottawa (CA); Max Green, Ottawa (CA)

(73) Assignee: FLYBY ROBOTICS, INC., Los Angeles, CA (US)

( * ) Notice: Subject to any disclaimer, the term of this patent is extended or adjusted under 35 U.S.C. 154(b) by 0 days.

(21) Appl. No.: 18/110,651

(22) Filed: Feb. 16, 2023

(65) Prior Publication Data

US 2023/0211883 A1   Jul. 6, 2023

Related U.S. Application Data

(63) Continuation of application No. PCT/US2022/053855, filed on Dec. 22, 2022.
(Continued)

(51) Int. Cl.
*B64D 1/22*   (2006.01)
*B64U 10/00*   (2023.01)
(Continued)

(52) U.S. Cl.
CPC .............. *B64D 1/22* (2013.01); *B64U 10/00* (2023.01); *B66D 1/38* (2013.01); *B66D 1/525* (2013.01); *B64U 2101/64* (2023.01)

(58) Field of Classification Search
CPC ... B66D 1/56; B66D 3/24; B66D 1/14; B66D 1/38; B66D 1/525; B64D 17/383;
(Continued)

(56) References Cited

U.S. PATENT DOCUMENTS 3,398,934 A * 8/1968 Lancashire .............. B66D 1/48
  258/1.4
3,565,402 A * 2/1971 Linke ....................... B66D 1/56
  254/362
(Continued)

FOREIGN PATENT DOCUMENTS

CN        110333100 A    10/2019
WO   WO-2018194712 A1   10/2018

OTHER PUBLICATIONS

USAASC, "Joint Precision Airdrop System (JPADS)", USAASC, date unknown. Retrieved from the Internet on Mar. 7, 2023, from https://asc.army.mil/web/portfolio-item/cs-css-joint-precision-airdrop-system-jpads/.
(Continued)

*Primary Examiner* — Michael R Mansen
*Assistant Examiner* — Nathaniel L Adams
(74) *Attorney, Agent, or Firm* — Perry + Currier Inc.

(57) ABSTRACT

The present specification provides a device and method for controlling a winch parcel delivery system through an uncrewed aerial vehicle (UAV) or drone. The example apparatus contemplates the use of a winch that will attach to a hook with active and passive release mechanisms through a winch line. The apparatus is enabled to attach to a parachute recovery system. The apparatus can detect when the ground has been reached to enable safe delivery of parcels. The apparatus can removably attach to various types of drones.

12 Claims, 23 Drawing Sheets

Related U.S. Application Data

(60) Provisional application No. 63/352,300, filed on Jun. 15, 2022, provisional application No. 63/295,191, filed on Dec. 30, 2021.

(51) Int. Cl.
  *B66D 1/38* (2006.01)
  *B66D 1/52* (2006.01)
  *B64U 101/64* (2023.01)

(58) Field of Classification Search
  CPC .... B64D 1/22; B66C 1/36; B66C 1/38; B66C 1/525; B64U 10/00; B64U 2101/64; B64U 2101/67
  See application file for complete search history.

(56) References Cited

U.S. PATENT DOCUMENTS

| | | | |
|---|---|---|---|
| 4,334,670 | A | 6/1982 | Kawabe |
| 9,676,481 | B1 | 6/2017 | Buchmueller |
| 9,783,297 | B2 | 10/2017 | Patrick et al. |
| 10,919,734 | B2 | 2/2021 | Zlotnik et al. |
| 11,104,438 | B2 | 8/2021 | Prager et al. |
| 11,225,325 | B1 | 1/2022 | Evans |
| 2005/0127695 | A1* | 6/2005 | Cranston ............... B66C 1/36 294/82.3 |
| 2016/0009393 | A1* | 1/2016 | Repp ............... B66D 1/60 254/323 |
| 2016/0059963 | A1 | 3/2016 | Burgess et al. |
| 2017/0267347 | A1 | 9/2017 | Rinaldi et al. |
| 2017/0334561 | A1 | 11/2017 | Sopper et al. |
| 2017/0355460 | A1 | 12/2017 | Shannon et al. |
| 2019/0300344 | A1 | 10/2019 | Cui |
| 2020/0299115 | A1* | 9/2020 | Bash ............... B66D 1/58 |
| 2020/0407061 | A1 | 12/2020 | Hafenrichter et al. |
| 2021/0309388 | A1* | 10/2021 | Ratajczak ............... B66C 1/36 |
| 2022/0089281 | A9 | 3/2022 | Sweeny et al. |

OTHER PUBLICATIONS

Time and Navigation, "Joint Precision Air Drop System (JPADS) parachute and guidance unit", timeandnavigation.si.edu, 2012, Retrieved from the Internet on Mar. 7, 2023, from URL: https://timeandnavigation.si.edu/multimedia-asset/joint-precision-air-drop-system-jpads-parachute-and-guidance-unit-0.

Wikiwand, "Joint Precision Airdrop System", Wikiwand.com, date unknown, Retrieved from the Internet on Mar. 7, 2023, from URL: https://www.wikiwand.com/en/Joint_Precision_Airdrop_System.

Forecast3D, "Multi Jet Fusion Materials", forecast3d.com, date unknown. Retrieved from the Internet on Mar. 15, 2023, from URL: https://www.forecast3d.com/materials/mjf.

Gens Ace, "Gens Ace 800mAh 2S 7.4V 40C LiPo battery pack with JST-SYP plug for 250 helicopter 800mm warbird", Amazon.com, date unknown, Retrieved from the Internet on Mar. 7, 2023, from URL: https://www.amazon.com/Gens-ace-Battery-JST-SYP-Helicopter/dp/B077JLLN59.

Maxon Group, "Maxon DCX 22L-22mm, graphite brushes, DC motor", xdrives.maxongroup.com, Apr. 2022, Retrieved from the Internet on Mar. 7, 2023 from URL: https://www.maxongroup.com/medias/sys_master/root/8992307937310/EN-22-110.pdf.

Portescap, "Brush DC Motors", V012021, portescap.com, 2021, Retrieved from the Internet on Mar. 7, 2023 from URL: https://www.portescap.com/-/media/project/automation-specialty/portescap/portescap/pdf/specification-pdfs/specifications_25gt2r82.pdf.

Penn, "Penn 345gti chrome worm gear", DadsOleTackle, date unknown, Retrieved from the Internet on Mar. 9, 2023, from URL: https://www.dadsoletackle.com/penn-42-345-penn-worm-gear.html.

\* cited by examiner

WINCH DELIVERY SYSTEM

PRIORITY

The present specification is a continuation of International Patent Application No. PCT/US2022/053855 filed Dec. 22, 2022, which claims priority from U.S. Provisional Patent Application No. 63/295,191 filed Dec. 30, 2021, and U.S. Provisional Patent Application No. 63/352,300 filed Jun. 15, 2022, the contents of which are incorporated herein by reference.

FIELD

The present specification relates generally to winch delivery systems and more specifically to lightweight winch delivery systems that employ lightweight motors, used for the rapid and controlled transfer of parcels.

BACKGROUND

Rapid advances in drone technologies offer the potential for ubiquitous use of drones in the delivery of parcels and other payloads. Delivery companies can potentially use these drones to provide delivery of payloads to remote locations. Traffic congestion and carbon emissions from delivery vehicles can be reduced. There is the potential for faster delivery times. However, significant challenges remain in the provision of safe, flexible and lightweight delivery systems.

SUMMARY OF THE INVENTION

Described herein and in accompanying documents are winch apparatuses including controllers, sensors, and actuators that provide controlled descent of a payload. In accordance with an aspect of the invention, there is provided a winch delivery system for connection to an underside of a drone comprising a housing including an attachment mechanism for connection to the drone, a motor within the housing for generating a rotational force at first speed, a gear assembly within the housing connected to the motor for translating the first speed into a second speed lower than the first speed, a reciprocating screw within the housing connected to the motor via the gear structure for rotation at the second speed, a spool in direct rotational communication with the motor for rotation at the first speed, and a winch line with a first end and a second end, the first end connected to the spool for winding the winch line evenly around the spool as guided by the reciprocating screw; the second end extending from the housing and for connecting to a payload.

The winch delivery system can comprise a slider for reciprocating along the length of the reciprocating screw; the slider having a channel for guiding the line along the length of the spool during winding. The winch delivery system can comprise a control unit for detecting altitude. The winch delivery system can comprise a hook assembly connected to the second end of the winch line, the hook assembly including a jaw for releasably carrying a parcel. The winch delivery system can have a mass of about 400 grams to about 440 grams. The motor can have a mass of between about 95 grams to about 145 grams. The winch delivery system can further comprise a solenoid pin in a slider for locking and releasing the hook assembly. The winch delivery system can further comprise a glow wire embedded in the slider. The control unit can allow the glow wire to burn and cut the line in the event of malfunction. The attachment mechanism can comprise a plurality of hanger sockets for removably attaching the winch assembly to the drone. The hook assembly can further include a servo lock which disengages when the electronic control unit detects that ground has almost been reached. The hook assembly can comprise a cylindrical magnet on the slider to detect when the hook assembly is near the winch. The hook assembly can comprise a hook bell having a conical shape to allow the hook bell to be locked against the solenoid pin in the slider. The hook bell can be attached to a circuit that detect the magnetic field of a magnet on the slider. The hook assembly can comprise a rotating jaw with an embedded magnet and a hook electronics board with an inertial measurement unit. The spool can be interchangeable.

In accordance with another aspect of the invention, there is provided a method for retracting a winch line having a first end for spooling and a second end for connecting to a payload when the second end is in an extended position, the method comprising the following steps: controlling a motor to generate a rotational force at first speed and causing a reciprocating screw to rotate at a second speed lower than the first speed and for guiding the line onto a spool, the rotational force for retracting the winch line from the extended position towards a retracted position; determining a speed of the second end; determining a force value being applied to the second end; adjusting the first speed based on the force value towards a desired speed of the second end; and, repeating the steps until a certain number of rotations of the motor have occurred that correspond to the second end reaching a retracted position. The first speed can be between 0 rotations per minute and about 40,000 rotations per minute and the second speed can be between about 0 rotations per minute and 4400 rotations per minute. The first speed can be between about 0 rotations per minute and about 18,000 rotations per minute and the second speed can be between about 0 rotations per minute and 9000 rotations per minute. A ratio between the first speed and the second speed is between about 1:1 and about 25:1. The speed can be calculated based on a weight at the second end In accordance with another aspect of the invention, there is provided an apparatus for parcel delivery using a drone, the apparatus comprising a winch assembly for connection to an underside of the drone, the winch assembly including a winch line and a motor for extending and retracting the winch line; and a hook assembly connected to the winch line, including a jaw for releasably carrying a parcel and an electronic control unit for detecting when the winch line has been sufficiently extended such that the hook assembly has been lowered to a safe delivery altitude and in response, releasing the jaw to deliver the parcel. The electronic control unit may detect said safe altitude.

The winch assembly may further include a spool around which the winch line is wrapped and a slider with a hole through which the winch line passes, where the spool is rotated by a motor coupled to a reciprocating screw that translates the rotary motion of the motor to linear motion, causing the winch line to evenly wrap around the spool. The spool may be interchangeable. The winch assembly may further include a solenoid pin in a slider for locking and releasing the hook. assembly. The winch assembly may further include a glow wire embedded in the slider, and wherein the electronic control unit controls cause the glow wire to burn and cuts the line in the event of malfunction. The winch assembly may further include a magnet on a spool shaft that allows an encoder on the electronic control unit to determine the length of winch line that has been unspooled. The winch assembly may further include a cylindrical magnet on the slider to detect when the hook assembly is near the winch. The winch assembly may further include a plurality of hanger sockets for removably attaching the winch assembly to the drone. The winch assembly may further include a removable battery that can be charged via a battery in the drone through a USB/USB-C port on the winch.

The hook assembly may further include a hook bell having a conical shape with a lid to allow the hook bell to be locked against the solenoid pin in the slider. The hook bell may be attached to a circuit that detects the magnetic field of a magnet on the slider. The hook assembly may further include a servo lock which disengages when the electronic control unit detects that ground has almost been reached. The hook assembly may further include a latch that pivots when the servo lock disengages. The hook assembly may further include a hook suspension arm and a plurality of springs attached to a plurality of shafts which pass through the suspension arm. The hook assembly may further include a rotating jaw with an embedded magnet and a hook electronics board with an inertial measuring unit. A disc may be secured to the legs of the drone by elastic strings configured to slow the ascent of the hook as it reaches the drone In accordance with another aspect of the invention, there is provided a method for parcel delivery using a drone, the method comprising a winch for receiving a command from a user over a telecommunication system, and a hook unlatching and opening when tension is released from the winch, releasing the parcel upon detecting a safe altitude, and relatching upon parcel release. The hook assembly unlatching from the winch assembly may be caused by a solenoid pin on the winch assembly retracting. The servo lock disengaging from the latch may occur when tension is released from the winch assembly. The method may further comprise the controlling of the winch motor through drivers on an electronic control unit. The method may further comprise of controlling the speed of the hook assembly using an encoder and a magnet on a spool, such that the hook assembly slows down near the ground to reduce impact.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
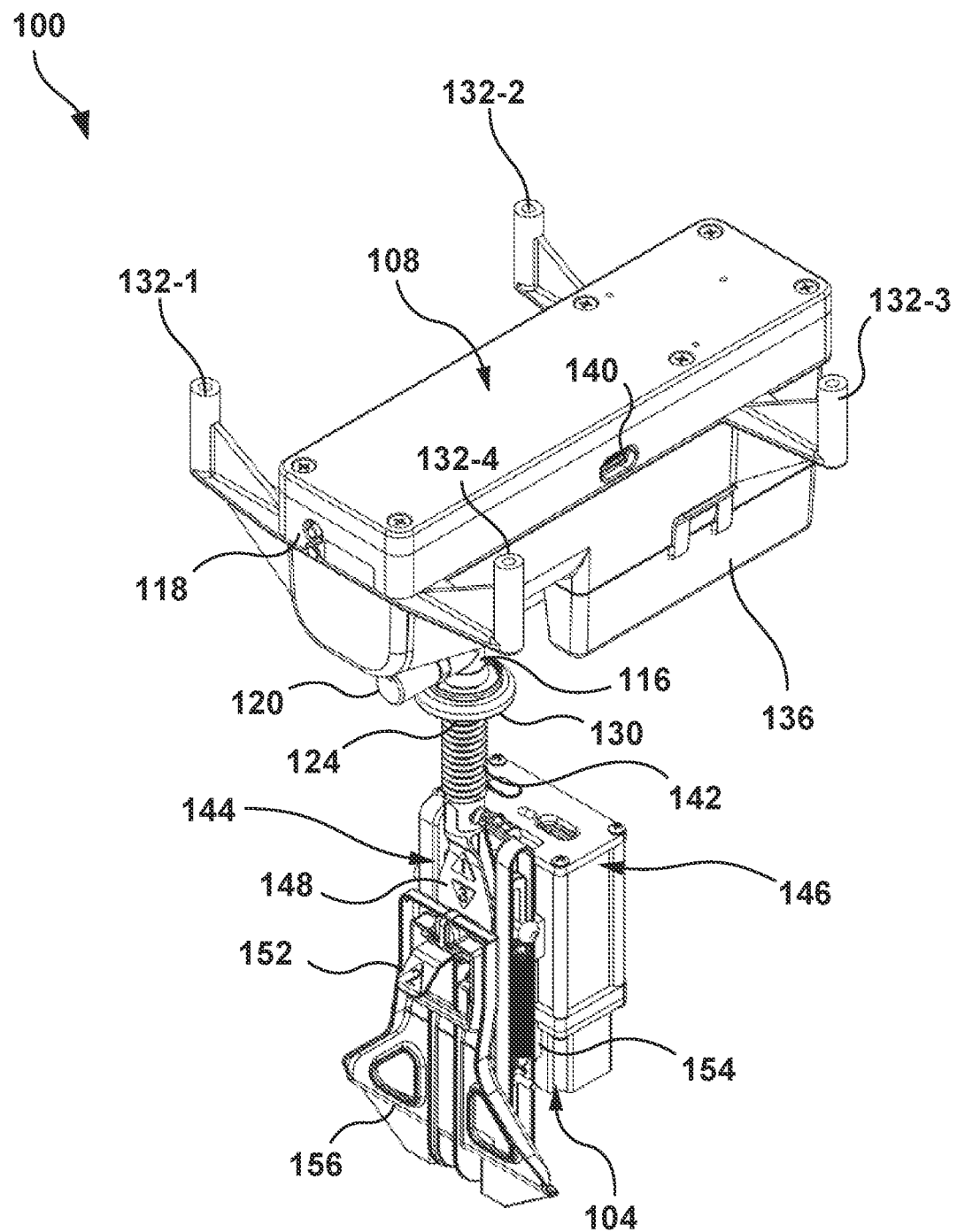
FIG. 1 shows an isometric view of an embodiment of the winch delivery system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The proposed technical solution relates to the use of Winch systems either on their own or integrated on uncrewed aerial vehicles (UAV) or drones to enable parcel delivery. The Winch Delivery Systems (WDS) described herein may be used for the rapid and controlled transfer of parcels.

Described herein and in accompanying documents are winch apparatuses including controllers, sensors, and actuators that provide controlled descent of a payload. The present disclosure relates to the use of winch delivery systems either on their own, or on interchangeable Unmanned Aerial Vehicles (UAV) or drones to enable parcel delivery using a conversion between a passive and an active release mechanism for the hook system. Further, the winch delivery system described herein may be further integrated with a Parachute Recovery System on a drone. This integration allows for a system that will meet regulatory requirements of flight over people. The present invention embodies a lightweight winch delivery system that is lighter than known systems, hence allowing for delivery of commercially meaningful payloads, without the need for heavy-lift drones.

Figure 2:
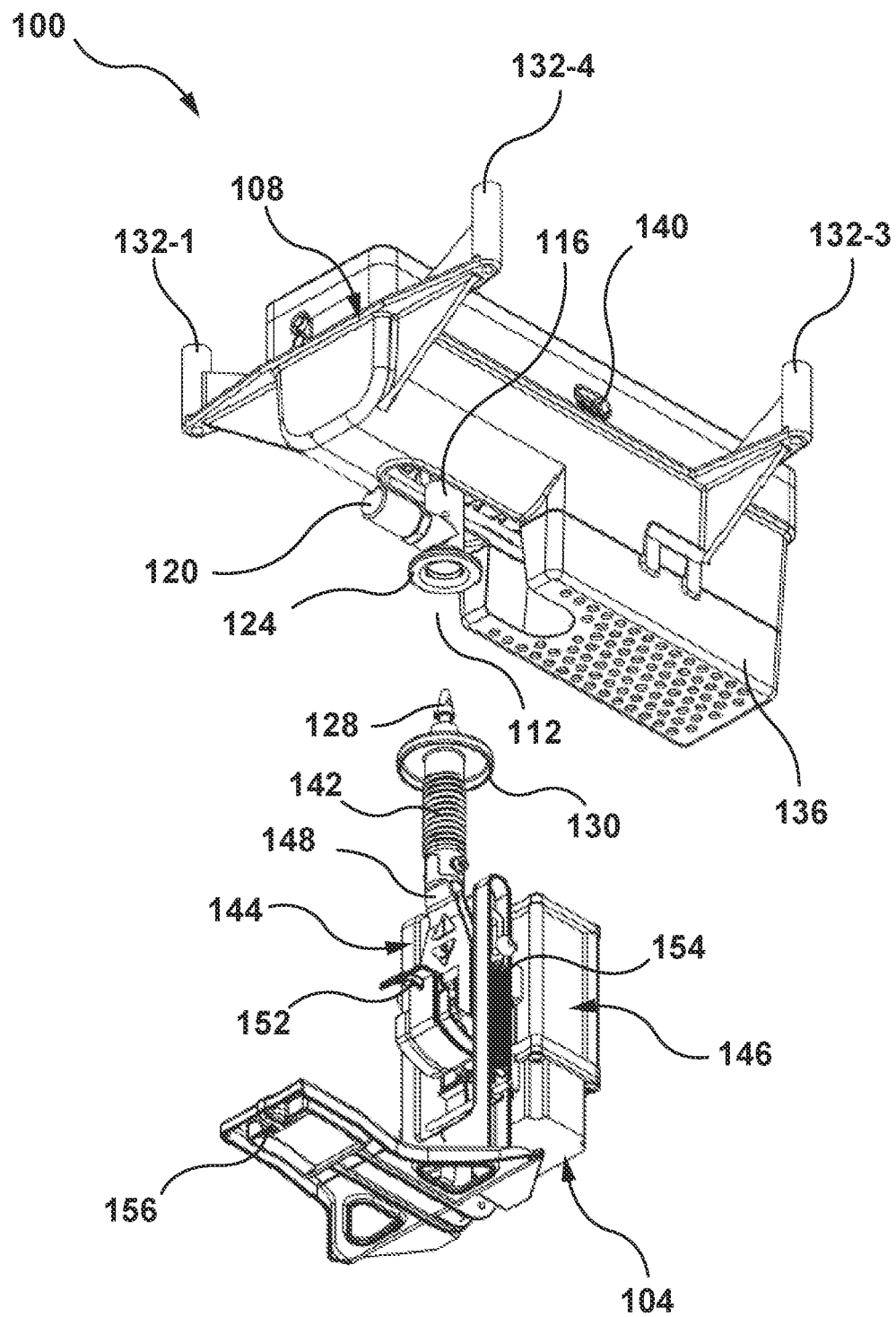
FIG. 2 shows a further isometric view of an embodiment of the winch delivery system in unlatched position.

FIG. 1 and FIG. 2 show an embodiment of winch delivery system 100, which is comprised of hook assembly 104 and winch assembly 108. Hook assembly 104 is attached to winch assembly 108 through a winch line 112. Winch line 112 is wrapped around a spool (not shown here) which is situated within winch assembly 108. The mechanics of winch line 112 will be discussed in further detail with regards to the interior of winch assembly 108, as will be seen in subsequent figures. Slider 116 is coupled to a solenoid pin 120 as well as a hook bell 128. Solenoid pin 120 works to secure hook bell 128 onto winch assembly 108. Suspension spring 142 is used to absorb any excess force that may be experienced upon hook assembly 104 upon the shock-load of a parachute deployment. Winch hat 124 comprises an embedded magnet that is used to detect the electronic circuit 130 surrounding hook bell 128 (on hook assembly 104) to detect when hook assembly 104 is latched to winch assembly 108.

A plurality of hanger sockets 132-1, 132-2, 132-3, and 132-4 allow for the removable connection to the underside of a drone. (Hereafter, hanger sockets 132-1, 132-2, 132-3, and 132-4 are referred to collectively as hanger sockets 132 and generically as socket 132. This nomenclature is used elsewhere herein). Hanger sockets 132 allow for attachment to different types of drones. In addition to removable connection to a drone, winch delivery system 100 can also integrate with a parachute recovery system on a drone. Winch assembly 108 is powered by an interchangeable battery 136 that can be charged by the drone's battery through USB/USB-C port 140. Winch assembly 108 can be reset through power button 118.

Hook assembly 104 further comprises of a passive hook 144 and an active hook backpack 146. Passive hook 144 comprises a suspension spring 142 and a suspension arm 148, which translates upward and downward with respect to the tension experienced by winch line 112. Suspension spring 142 allows for parachute deployment shock absorption. Upon a large shock force from parachute deployment, suspension spring 142 [along with solenoid pin 120] absorbs the shock force. Suspension arm 148 is connected to latch 152, which swivels and locks parcels through a tension spring 154. Jaw 156 on hook assembly 104 pivots and becomes secured by latch 152. FIG. 1 shows jaw 156 in closed position, and FIG. 2 shows jaw 156 in an open position. The mechanics of hook assembly 104 will be discussed in further detail with regards to subsequent figures that show hook assembly 104 in greater detail.

Figure 3:
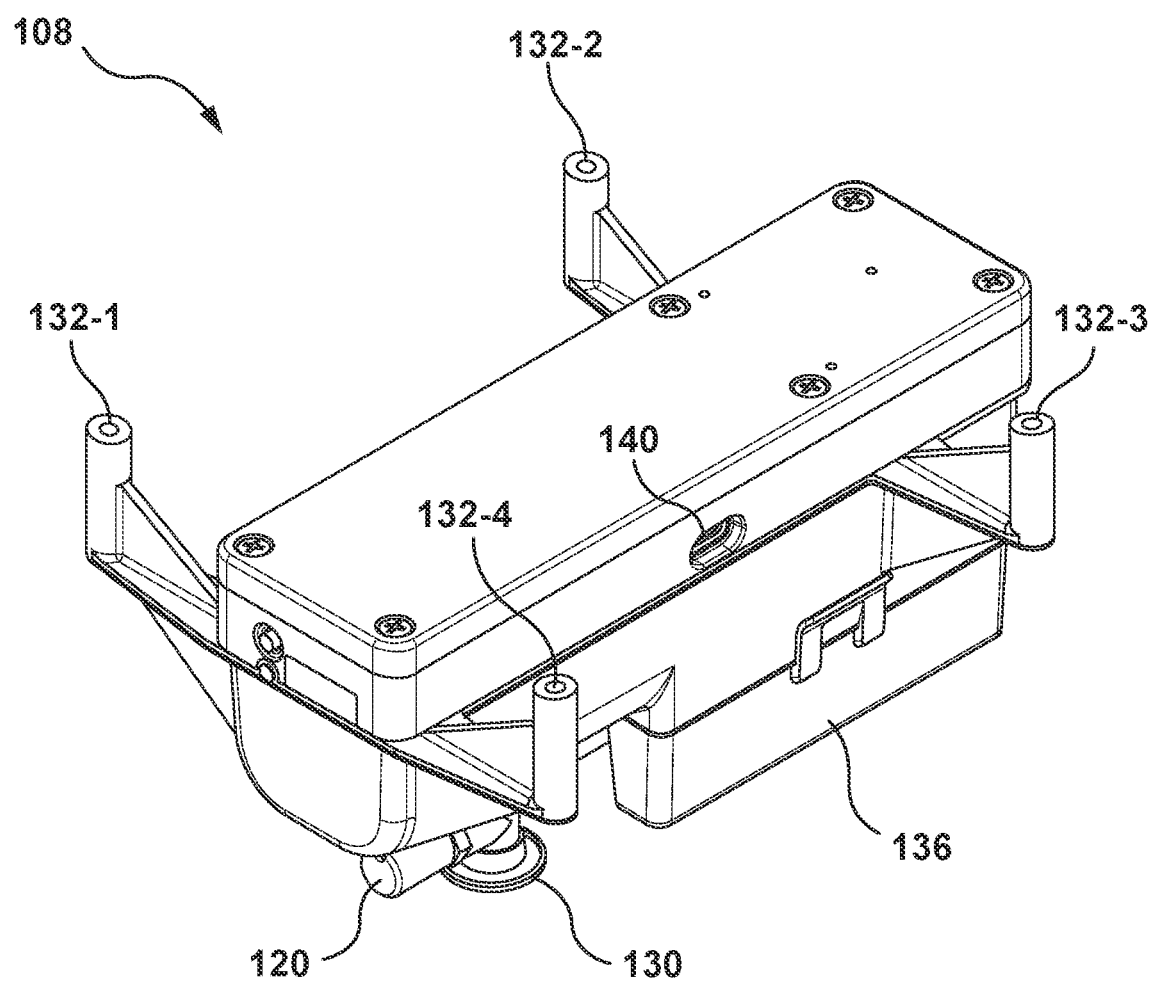
FIG. 3 shows an isometric view of an embodiment of the winch assembly.
Figure 4:
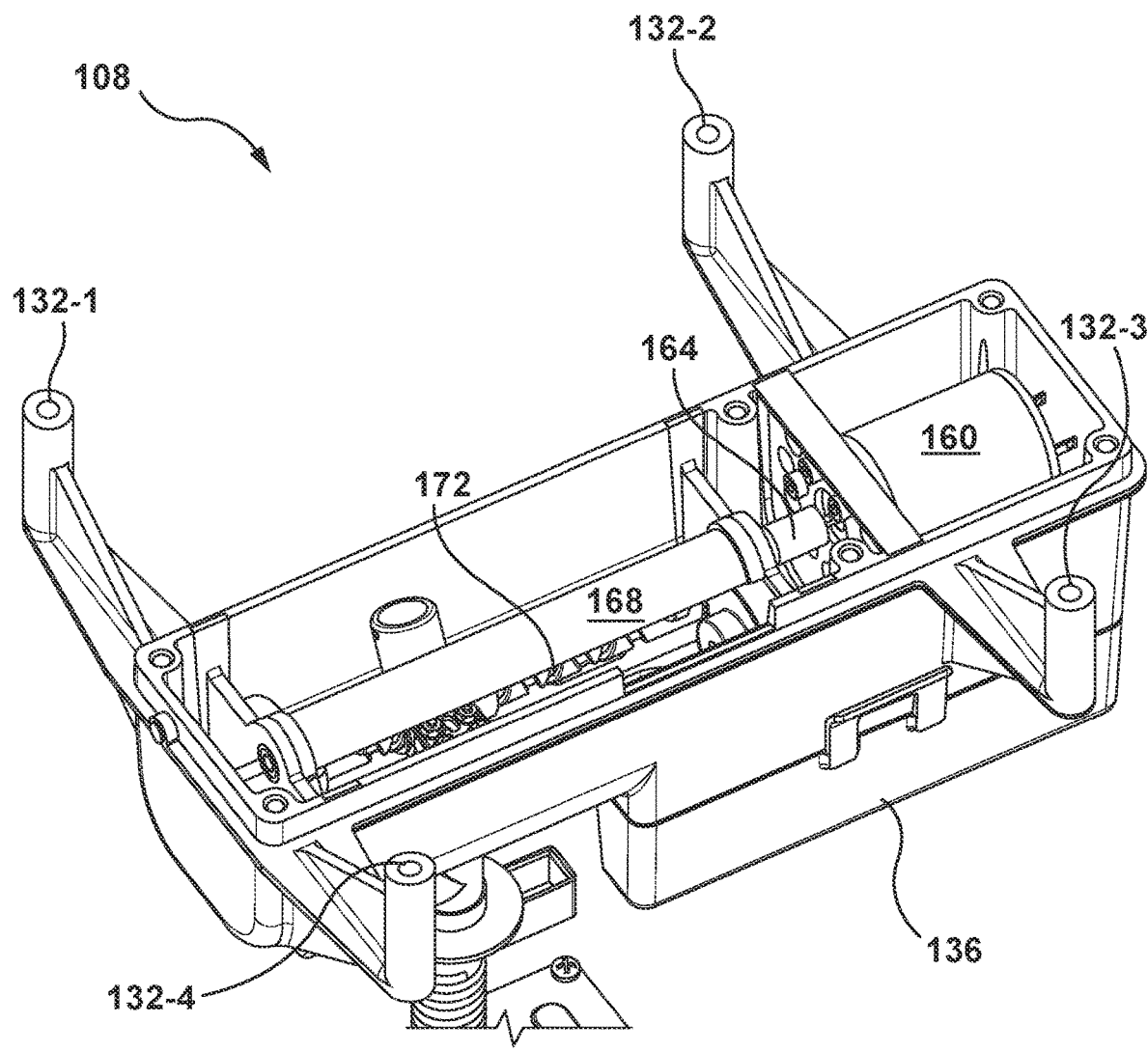
FIG. 4 shows a top isometric view of an embodiment of the interior of the winch assembly.
Figure 5:
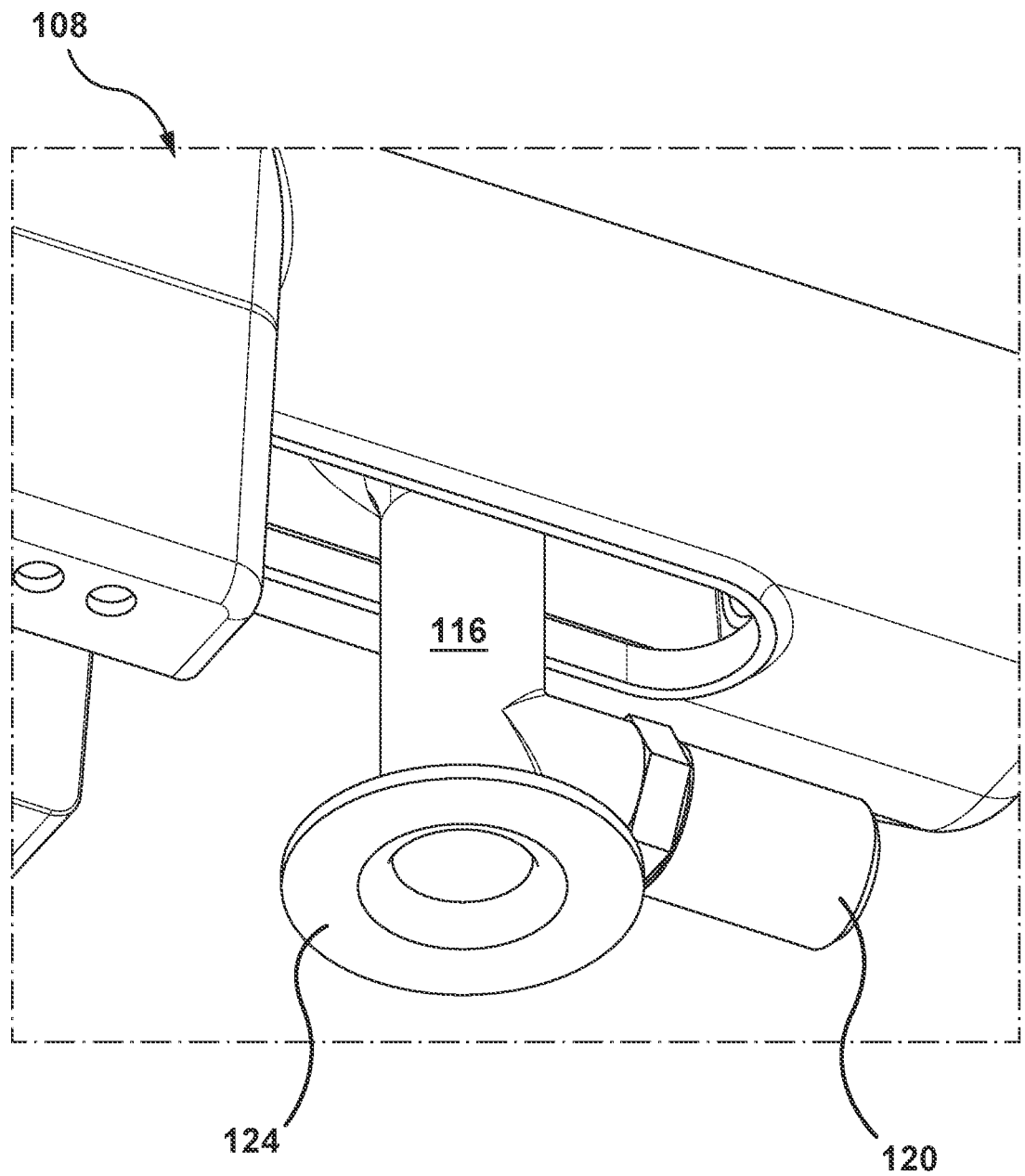
FIG. 5 shows an underside view of a portion of the winch assembly.

FIG. 3, FIG. 4, and FIG. 5 show the exterior and interior views of winch assembly 108 in greater detail. As can be seen in FIG. 4, winch assembly 108 is operated by a motor 160, which is connected to a coupler 164, which allows motor 160 to rotate spool 168. As discussed briefly above, winch line 112 wraps around spool 168. Spool 168 may be interchangeable. For example, in situations where winch line 112 is cut, the spool 168 may be replaced with a new winch line 112 around it. In operation, as winch line 112 unravels, it runs through a hole or eye on slider 116 in the form of a channel. Slider 116 is coupled to reciprocating screw 172, which allows for hook assembly 104 to ascend and descend. Slider 116 travels along a reciprocating screw 172. Reciprocating screw 172 translates the rotary motion of motor 160 within winch assembly 108 into linear motion, thus reciprocating the translation of slider 116 running back and forth along reciprocating screw 172. This reciprocating motion evenly wraps winch line 112 around the spool 168. The underside view of slider 116, winch hat 124 and solenoid pin 120 can be seen in FIG. 5. Within slider 116 and winch hat 124 sits a spool extruder (not shown) that allows for propulsion of winch line 112.

Figure 6:
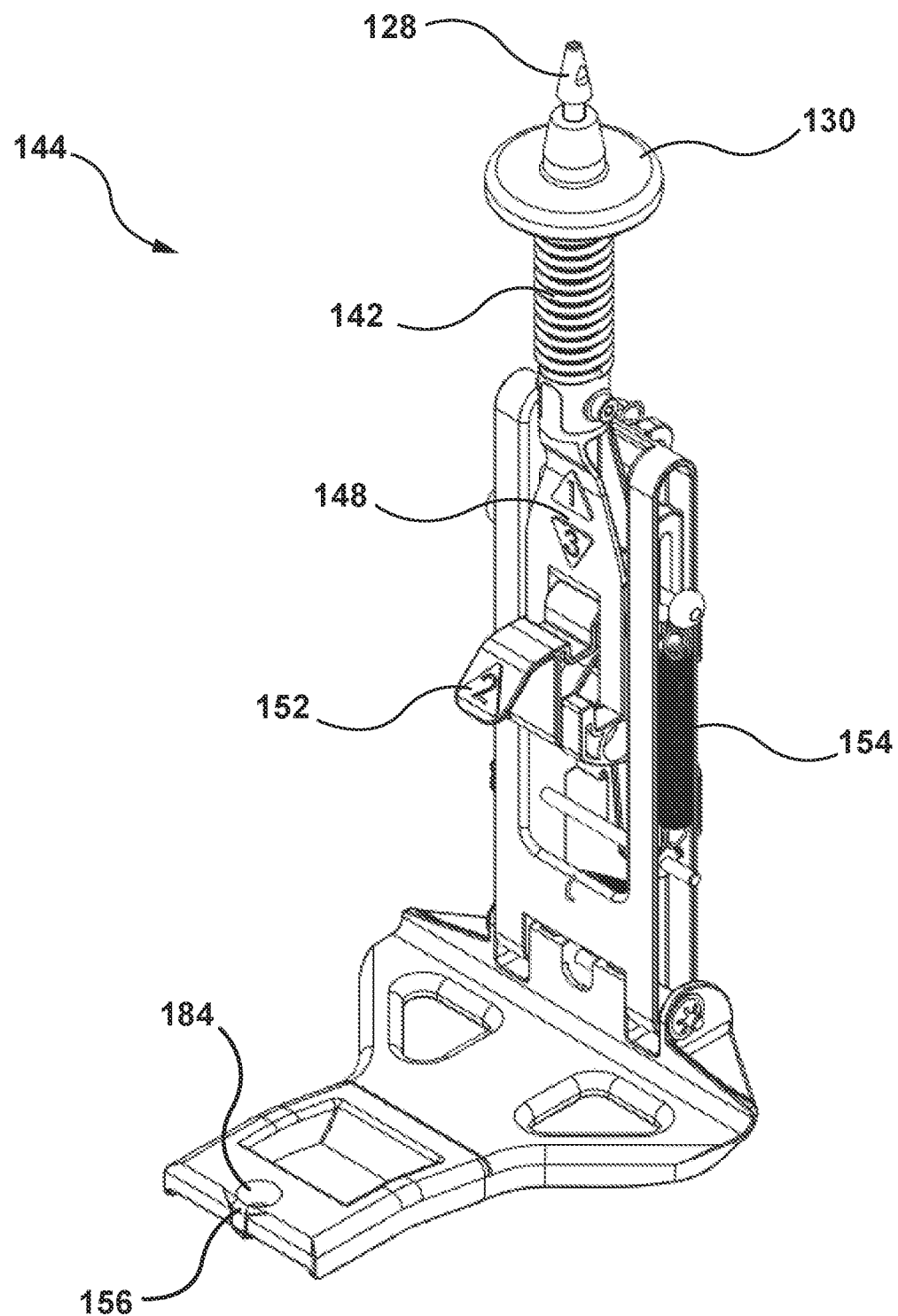
FIG. 6 shows an isometric view of an embodiment of the passive hook of the hook assembly.
Figure 7:
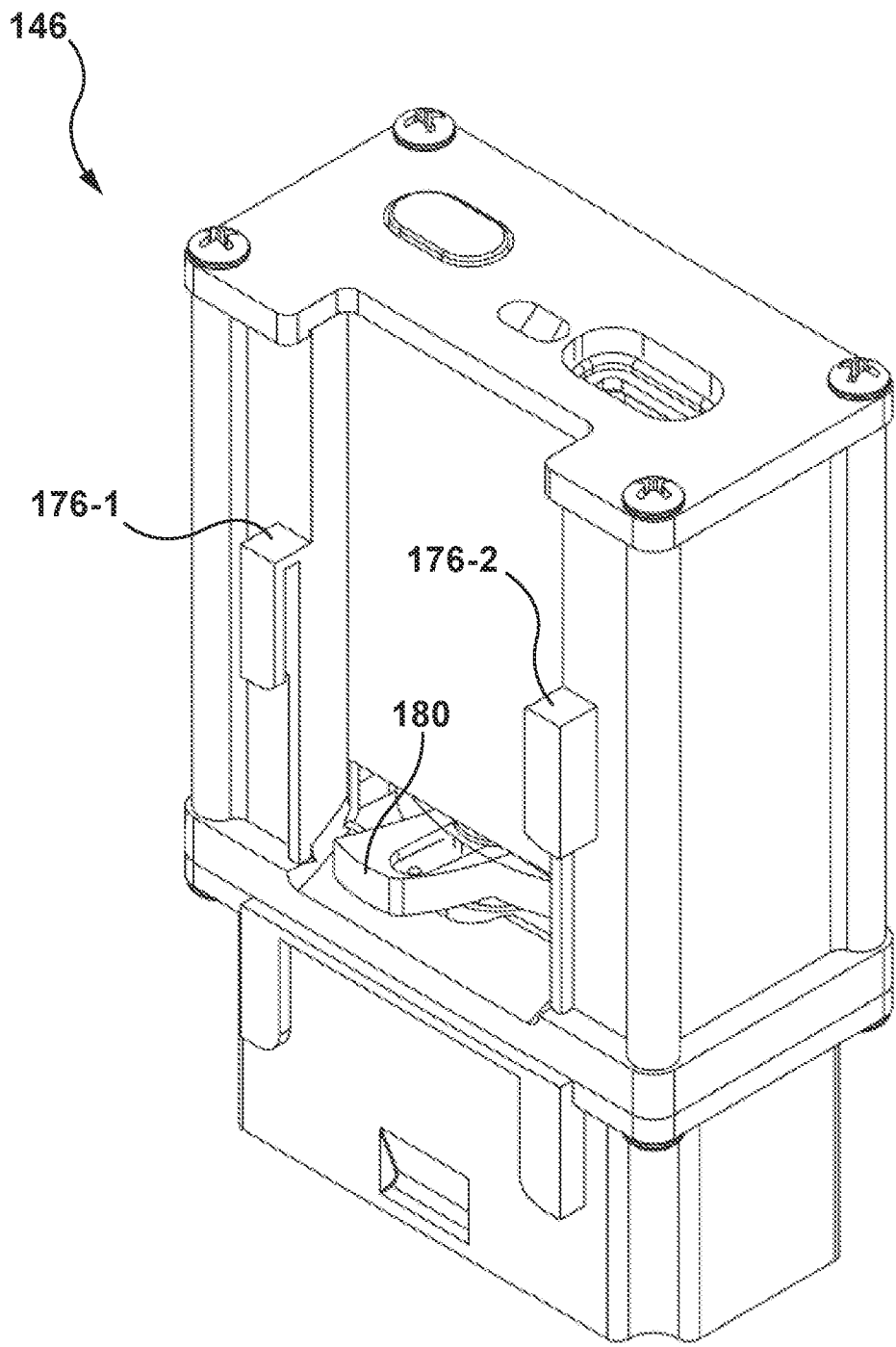
FIG. 7 shows an isometric view of an embodiment of the active hook backpack of the hook assembly.

FIG. 6 and FIG. 7 show hook assembly 104 in greater detail. Specifically, details of passive hook 144 are shown in FIG. 6, and details of active hook backpack 146 are shown in FIG. 7. Active hook backpack 146 attaches to passive hook 144 through attachment notches 176. The design of active hook backpack 146 allows winch delivery system 100 to be drone-agnostic. Active hook backpack 146 secures parcels so that they do not fall off. Servo lock 180 engages latch 152 to prevent latch 152 from swiveling. In operation, hook assembly 104 opens when tension is released on winch line 112, and servo lock 180 is disengaged from latch 152. Servo lock 180 disengages when the electronic control unit in the hook assembly 104 detects that ground has almost been reached through its embedded barometer which calculates the altitude based on the measured pressure. The electronic control unit within winch assembly 108 detects the ground by measuring the change in barometric pressure and is preprogrammed to open at a certain altitude. Winch delivery system 100 uses an encoder to count spool rotations. When the encoder detects no change in the spool rotation count, it assumes the ground has been reached and then starts the ascent phase. Through the counting of spool rotations, winch delivery system 100 is enabled to dynamically slow the attached parcel. Upon detecting that ground has almost been reached, latch 152 will rotate. Hook suspension arm 148 is slidable downwards when tension is released on winch line 112 through the force of springs 154 attached to shafts on suspension arm 148. When the suspension arm 148 slides down, the shafts are pushed down on latch 152, which further rotates latch 152, and causes jaw 156 to open. Jaw 156 pivots around a shaft jaw 156 further includes a magnet 184, which the magnetometer unit on the hook electronics circuit uses to determine if jaw 156 is open or closed. When jaw 156 and latch 152 are closed, the hook electronics circuit sends a signal to servo lock 180 to lock latch 152.

Figure 8:
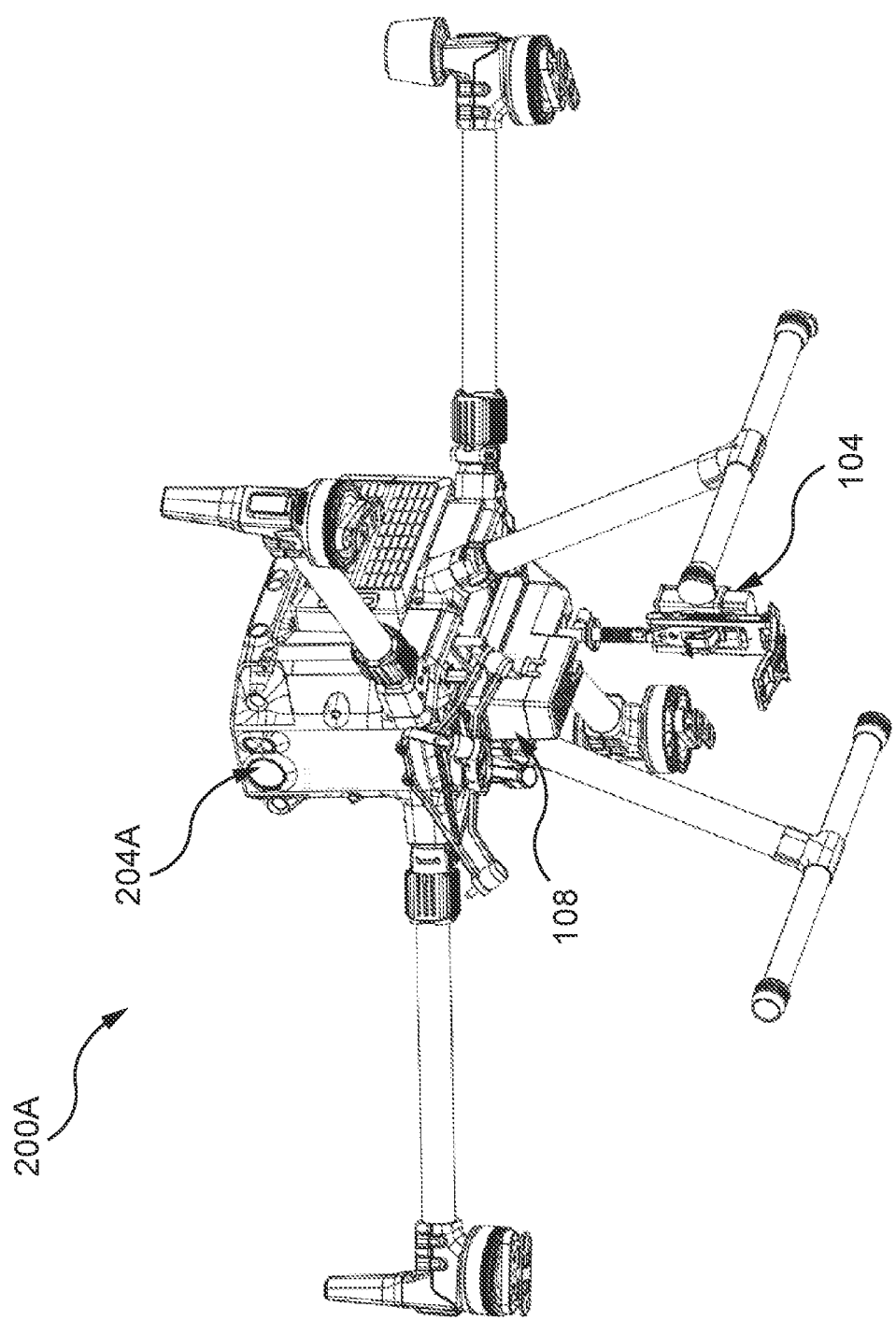
FIG. 8 shows a front view of an embodiment of the winch delivery system when connected to a drone.

FIG. 8 shows an embodiment of a drone payload delivery system 200a, which comprises of the complete winch delivery system with winch assembly 108 and hook assembly 104, connected to a drone 204a. Winch assembly 108 may be equipped with an emergency cut feature that allows the user to cut winch line 112 in the event of an emergency, such as if a parcel is stuck on a tree or if winch line 112 is tugged during the flight. A current is sent through a glow wire embedded in winch assembly 108 to heat it up. The glow wire is in contact with winch line 112 at all times, and when heated up, will cause the winch line 112 to be cut.

The winch delivery system may be equipped with a controlled descent feature. Motor 160 is controlled by drivers on the winch assembly 108 electronic unit. The descending speed of the hook assembly 104 is slowed near the ground to reduce impact. The control algorithm is used through the encoder and magnet on the spool 168 to determine the speed of descent of hook assembly 104 and adjusts the power of motor 160 accordingly. The input is the desired speed of descent of the package, the actual speed is measured by the encoder and magnet, and the output is the actual speed of the package.

Figure 9:
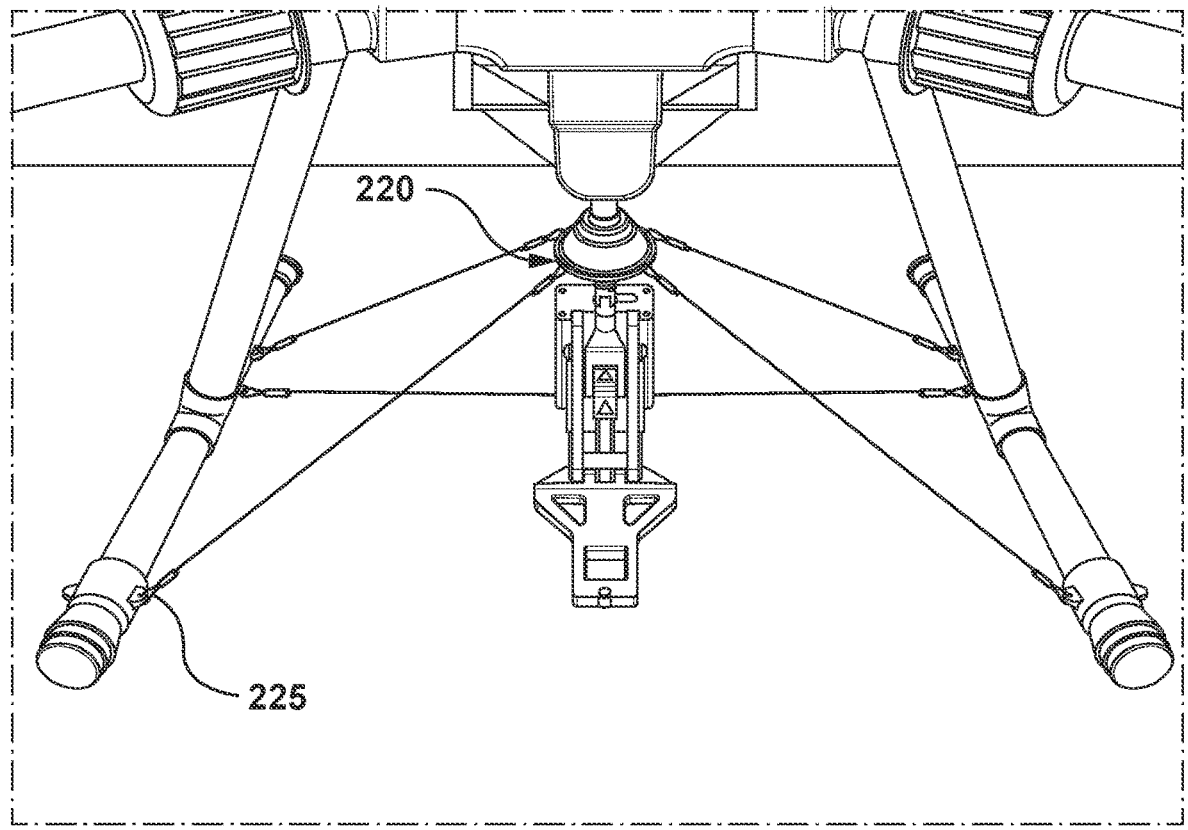
FIG. 9 shows a front view of an embodiment of the hook catcher.

FIG. 9 shows that winch delivery system may be further equipped with a hook catcher 220 that stabilizes hook assembly 104 before latching. When hook assembly 104 is raised up, it will swing due to wind and/or a disturbed mass of air pushed aft or fore by the propellers of the drone. The hook catcher may be used to prevent the hook assembly 110 from swinging excessively. Hook catcher 220 may be a circular piece of plastic that enables hook bell 128 to reach the winch assembly 108 but catches on the outer lip of the top of hook bell 128. Hook catcher 220 is secured to the legs of a drone through elastic strings 225 that slow the ascent of the hook assembly 104 as it reaches the drone.

In operation, a parcel is secured to jaw 156 and servo lock 180 is engaged. Winch assembly 108 will receive a command from a user over Long Term Evolution (LTE) Network, Radio Frequency (RF) Network, or any other telecommunications system. Upon reception of this command, winch assembly 108 unlatches hook assembly 104 by retracting solenoid pin 120. This will lower the hook assembly 104. Upon detection of a safe altitude by the hook assembly 104, latch 152 will open. This will lower the parcel, release tension in winch line 112, and will open hook assembly 104. If the package does not release, winch assembly 108 is enabled to perform an eject maneuver to release the parcel. Winch assembly 108 will then raise the hook assembly 104, and hook assembly 104 will slow down. If the winch delivery system 100 is equipped with a hook catcher 220, the hook assembly 104 will become captured at this point. The hook assembly 110 is then relatched when the solenoid pin 120 extends and locks on bell 128. A safe altitude may be identified in a number of manners, and may be based upon a number of factors, such as the profile of the article that is being delivered, as well as what the parcel will be susceptible to in terms of external forces, such as wind speed at the time of delivery. Other factors to be considered when determining a safe delivery altitude will become apparent to those of skill in the art.

Figure 10:
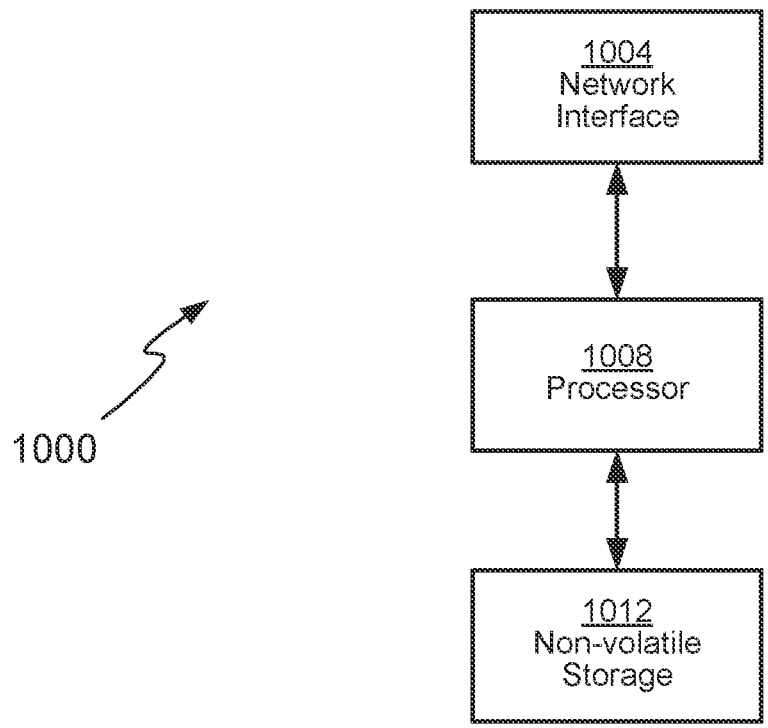
FIG. 10 is a block diagram representing the winch delivery system.

To expand on the operation of winch delivery system 100, a non-limiting example of the firmware of winch delivery system 100 is discussed in greater detail in FIG. 10 in the form of a block diagram. Winch delivery system 100 connects to a network interface 1004, for connecting to network such as an LTE network, an RF network, or any other telecommunications network. Input from network 1004 is received at a processor 1008. Network interface 1004 can thus be generalized as a further input device that can be utilized by a processor 1008 to fulfill various programming instructions that will be further discussed. In variations, processor 1008 may be implemented as a plurality of processors. Processor 1008 can be configured to execute programming instructions that are responsive to the input received via network interface 1004. To fulfill its functions, processor 1004 is also configured to communicate with at least one non-volatile storage-unit 1012, (e.g., EEPROM or Flash Memory). Programming instructions that implement the functional teachings of winch delivery system 100 as described herein are typically maintained, persistently, in non-volatile storage unit 1012 and used by processor 1008.

Figure 11:
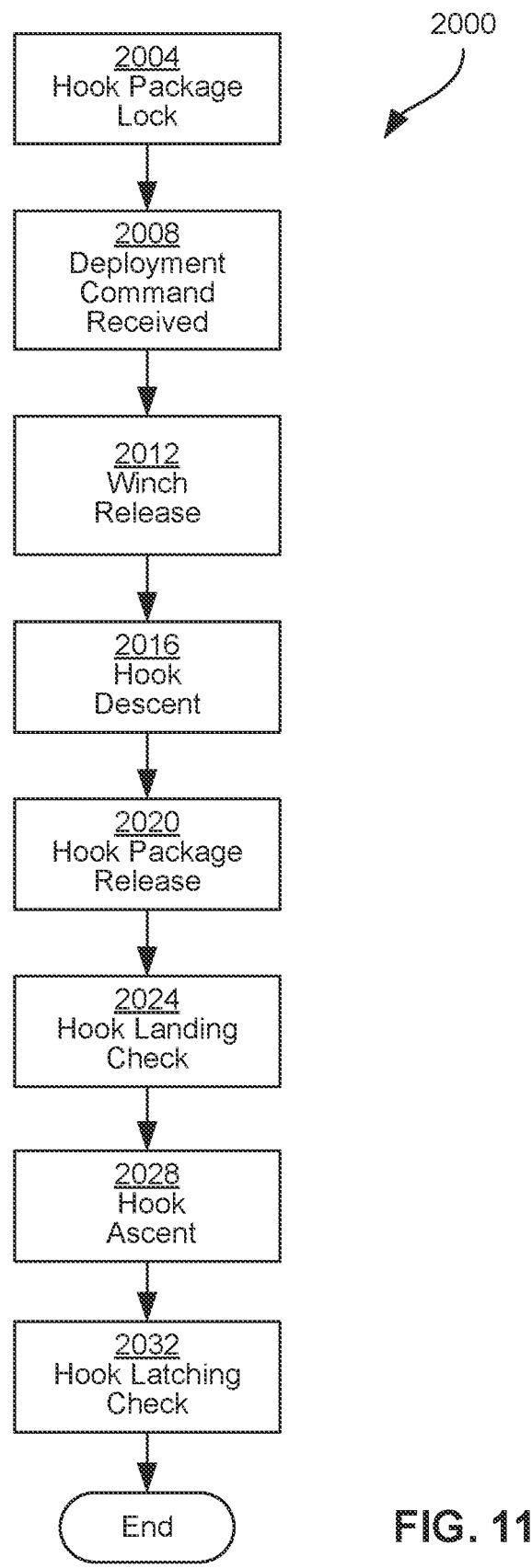
FIG. 11 is a block diagram representing a method by which the winch delivery system operates.

To further assist in understanding winch delivery system 100, reference will now be made to FIG. 11, which shows a flowchart indicated generally at 2000, depicting the method of operation of winch delivery system 100. Hereafter, the flowchart will be referred to as method 2000, and this nomenclature will apply to other methods and flowcharts discussed herein. Method 2000 can be implemented on winch delivery system 100, but it is to be understood that method 2000 can also be implemented on variations of winch delivery system 100. Additional methods discussed herein in relation to winch delivery system 100 are subject to the same non-limiting interpretation. For illustrative convenience, method 2000 will now be discussed in relation to winch delivery system 100.

Figure 12:
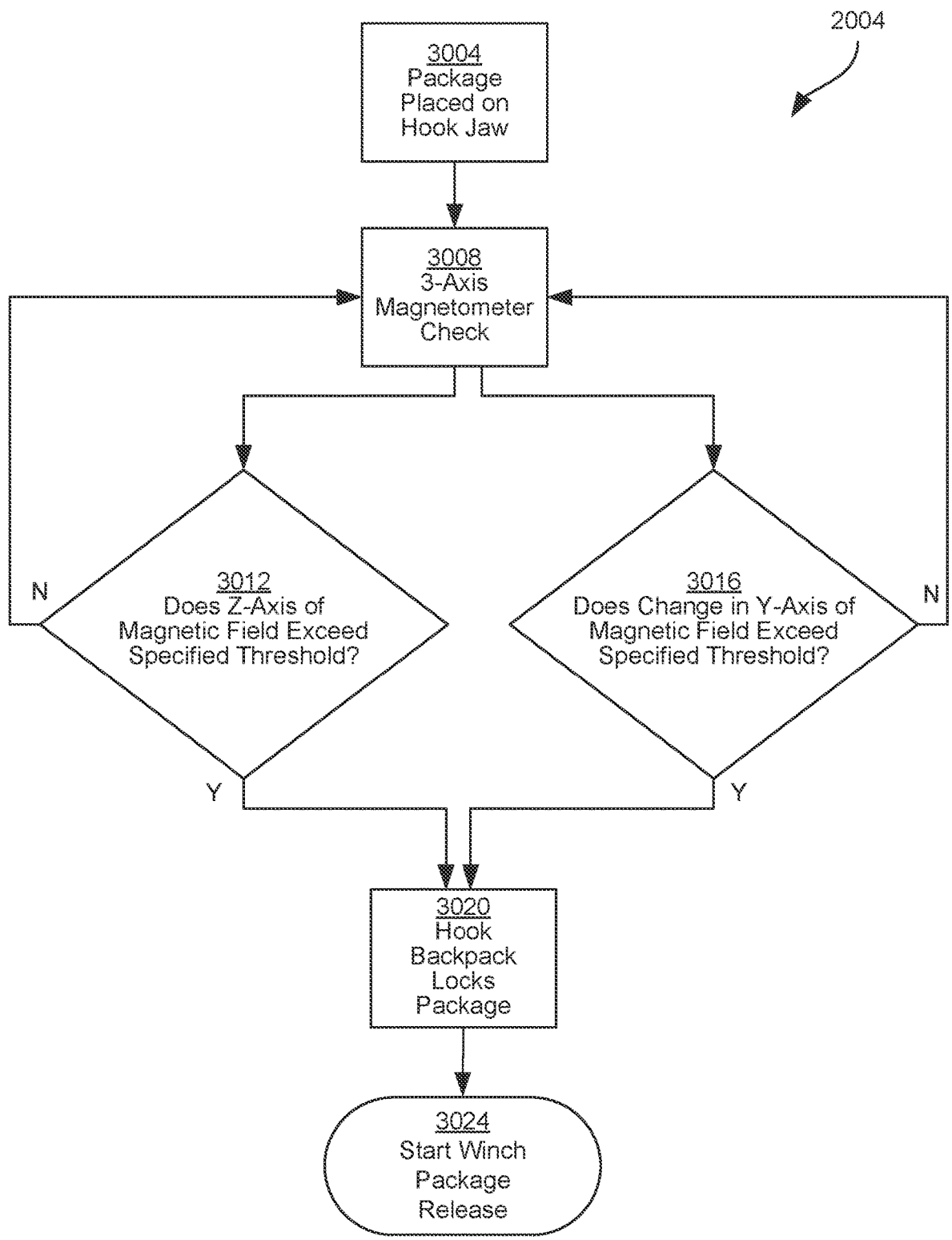
FIG. 12 is a block diagram representing a package lock step of the method by which the winch delivery system operates.

At block 2004, the hook package lock process is started, wherein the winch delivery system 100 initiates the lock process to ensure that a package is secured into winch delivery system 100. This is done to reduce the likelihood of the package falling off of hook assembly 104 when it is in operation. The process at block 2004 is depicted in greater detail with reference to FIG. 12, wherein block 2004 is depicted as its own method. At block 3004, a user places the package onto jaw 156 of winch delivery system 100. The user will close jaw 156 which will bring magnet 184 close to hook backpack 146, as discussed above. As the user releases jaw 156, the attached package will fall down due to the force of gravity, while suspension arm 148 remains constant. This will thus change the distance between a set of magnets embedded within latch 152 on passive hook 144 and a 3-axis magnetometer sensor on hook backpack 146 At block 3008, a 3-axis magnetometer check is initiated, which comprises two parts. The first part, at block 3012, is a check of whether or not the Z-axis of the magnetic field between magnet 184 and the 3-axis magnetometer on hook backpack 146 exceeds a specified threshold. If the magnetic field strength in the Z-axis is greater than a specified threshold, this means that the 3-axis magnetometer is experiencing the magnetic force which is caused by the closing of jaw 156 and the magnet 184 being brought close to hook backpack 146. If it does not exceed the specified threshold, the check will be re-initiated at block 3008. The second part of the 3-axis magnetometer check is initiated simultaneously to block 3012 at block 3016, wherein a check is done to verify whether or not a change in the Y-axis of the magnetic field exceeds a specified threshold. If the magnetic field strength in the Y-axis is greater than a specified threshold, this means that the weight of a package is resting on jaw 156 and the weight of the package shifted jaw 156 down relative to suspension arm 148, moving a set of magnets embedded within latch 152. If it does not exceed the specified threshold, the check will be re-initiated at block 3008. Upon a "yes" to both checks at block 3012 and block 3016, a signal is sent to servo lock 180 to lock latch 152. At block 3024, the hook package lock process 2004 is completed and the winch package release process is ready to start.

Figure 13:
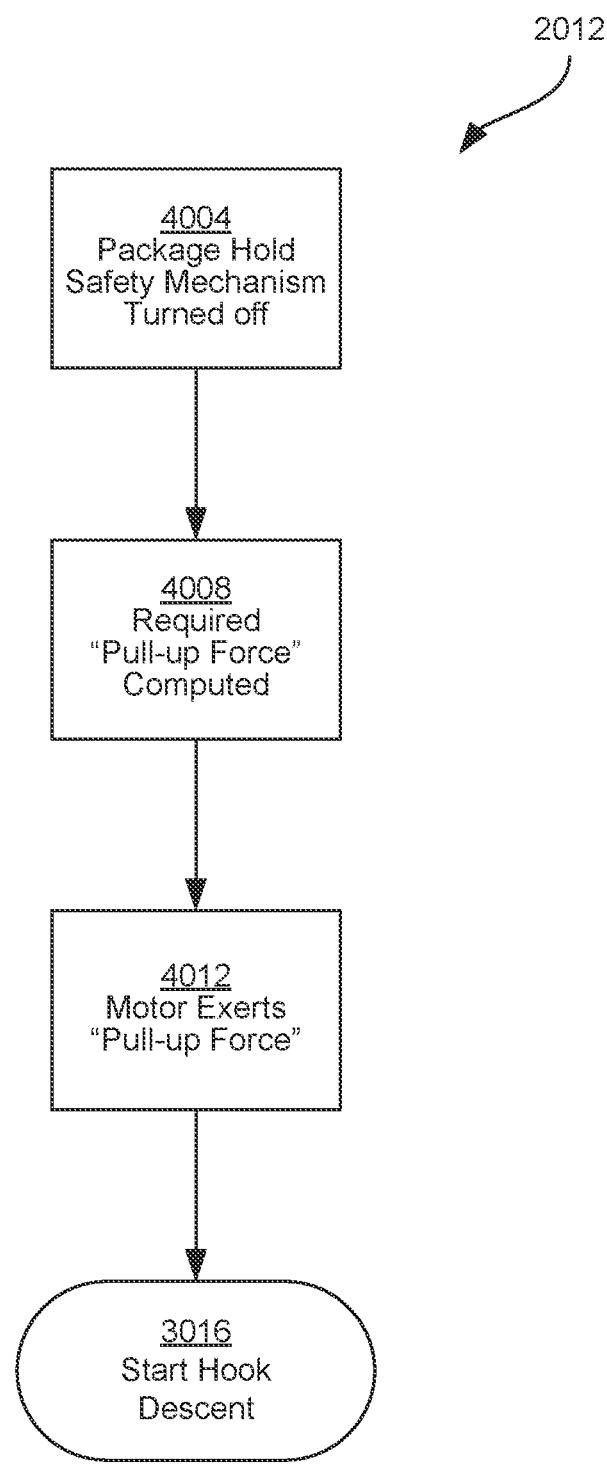
FIG. 13 a block diagram representing a winch release step of the method by which the winch delivery system operates.

Referring back to FIG. 11, at block 2008, a deployment command is received by winch delivery system 100. The deployment command at block 2008 initiates the winch release process at block 2012. The winch release process 2012 is the process by which the winch assembly 108 releases hook assembly 104. The process at block 2012 is depicted in greater detail with reference to FIG. 13, wherein block 2012 is depicted as its own method. At block 4004, as a deployment command has been received, the package hold safety mechanism is turned off. This is achieved by retracting solenoid pin 120. At block 4008, the required "pull-up" force is determined or computed. This force is computed via the determined weight of the package. The weight of the package is required to decouple solenoid pin 120 from hook assembly 104, as the motor 160 within winch assembly 108 is required to "pull" the package up and enable the package to fall due to the force of gravity. As such, this applied "pull-up" force is dependent upon the weight of the package. In the event that the weight of the package is high, and the pull-up force is too low, the winch assembly 108 may not be able to release solenoid pin 120 from hook assembly 104, and damage to the internal components of winch delivery system 100 may be incurred. At block 4012, the determined "pull-up" force is exerted by motor 160, and the hook assembly 104 is successfully released from winch assembly 108, at which point at block 4016, the hook descent process is ready to begin.

Figure 14:
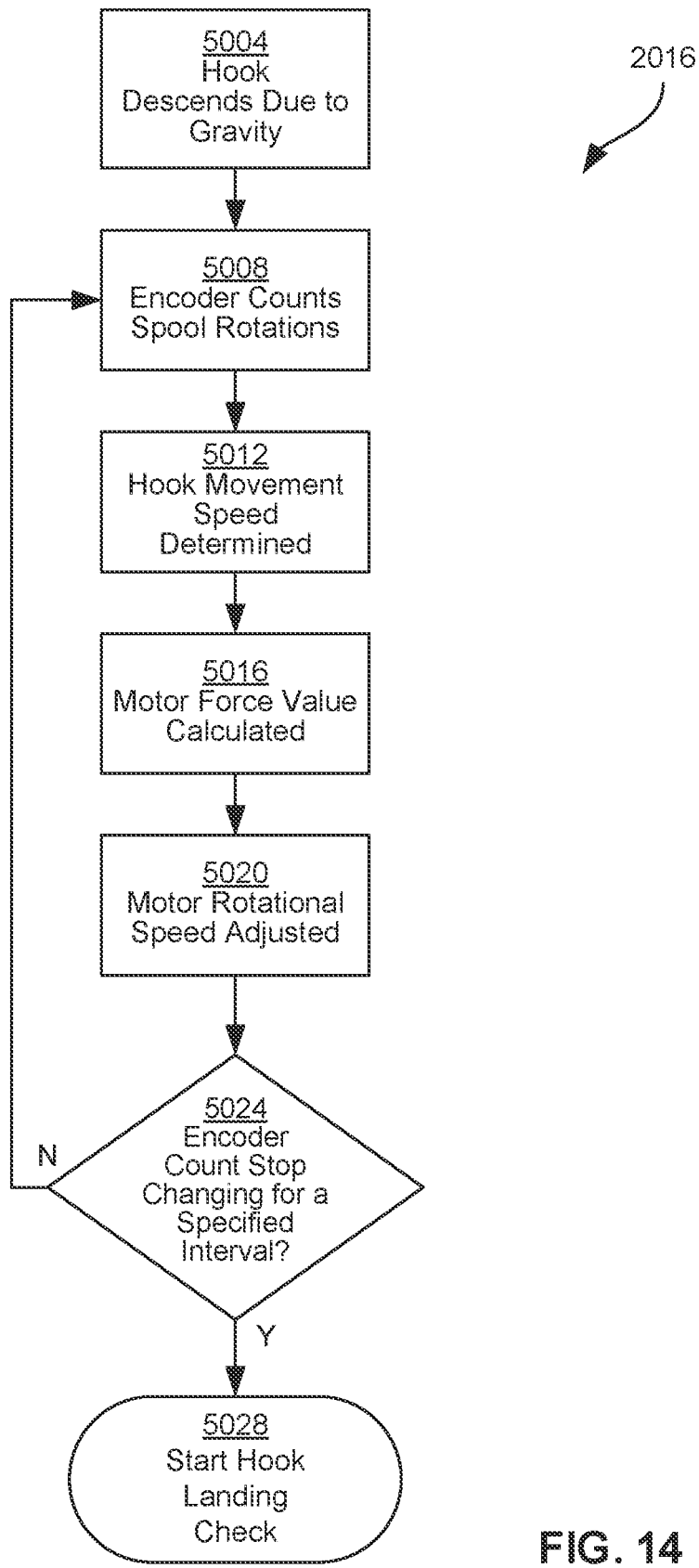
FIG. 14 is a block diagram representing a hook descent step of the method by which the winch delivery system operates.

Referring back to FIG. 11, at block 2016, the hook descent process is initiated upon completion of the winch release at block 2012. The hook descent process at block 2016 is the process of controlling the descent of hook assembly 104 as it is released from winch assembly 108. The process at block 2016 is depicted in greater detail with reference to FIG. 14, wherein block 2016 is depicted as its own method. At block 5004, the hook assembly 104 begins to descend due to the force of gravity. As hook assembly 104 is descending, at block 5008, the encoder begins to count revolutions of spool 168 as winch line 112 is unraveled, as previously described above. Each time spool 168 completes one full revolution, a negative one (−1) count is added to a value known as the total encoder value. As the total encoder value is counted by the encoder, at block 5012, a speed monitoring software within the electronic control unit of hook assembly 104 records the updated rate of the encoder in order to calculate the hook movement speed value, which is used to manipulate the speed of the hook movement. The hook speed movement is necessary in order to be able to match the speed of the hook movement to a pre-computed desired hook speed profile, which is a pre-determination of the speed at which the hook assembly 104 should be moving at with respect to the total encoder value. In other words, the hook speed movement value is used to align the speed of hook assembly 104 to a pre-determined desired speed. At block 5016, the speed monitoring software uses the hook movement speed value to determine the motor force value required to apply to the motor 160 to slow down hook assembly 104 to the desired hook speed. The motor force value is applied to the hook at 5020, wherein the motor rotational speed is adjusted via the application of required motor force value. At 5024, there is a check of whether or not the encoder count does not change for a pre-specified landing time duration (such as, for example, about five seconds). If there is no change in the encoder count for the duration of this specified interval, the hook assembly has landed onto the ground, as spool 168 is no longer moving, and the hook landing check process is ready to begin at block 5028. If there is a change in the encoder count, the process will repeat until it is determined that the hook assembly 104 has reached ground.

(The hook descent can also cause regenerative charging of the battery as the rotational force on the motor can translate into an electrical charge for the battery.)

Figure 15:
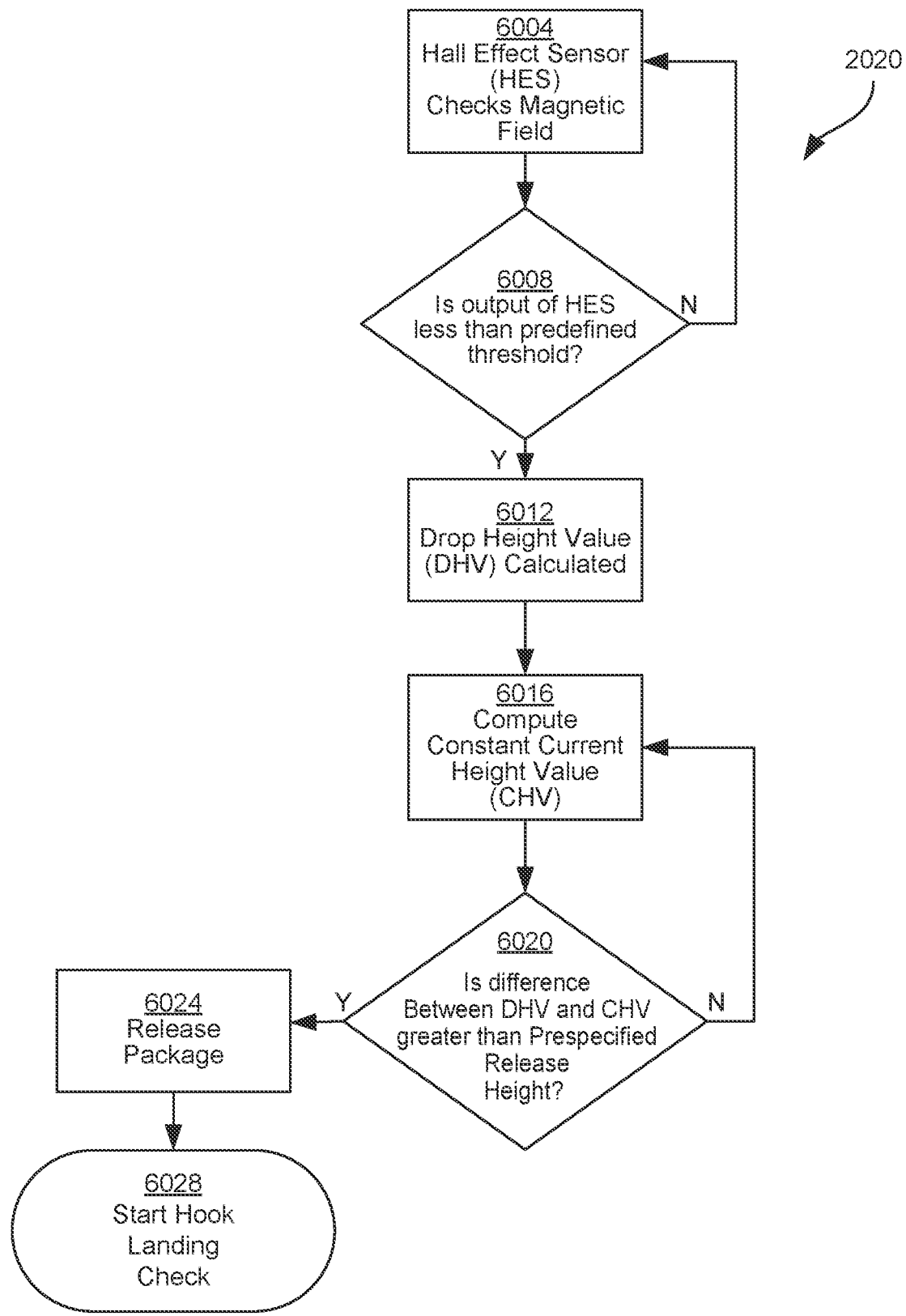
FIG. 15 a block diagram representing a package release step of the method by which the winch delivery system operates.

Referring back to FIG. 11, at block 2020, the hook package release is initiated upon completion of the hook descent at block 2016. The hook package release process is required to release the package from hook assembly 104 safely and at the proper location. The process at block 2020 is depicted in greater detail with reference to FIG. 15, wherein block 2020 is depicted as its own method. It should be noted that block 2020 may be completed in parallel with block 2016. As the hook assembly 104 is in descent, the distance between winch hat 124 and a hall effect sensor on hook assembly 104 changes. At block 6004, the hall effect sensor on hook assembly 104 checks the surrounding magnetic field between the winch hat 124 and the hook assembly 104. At block 6008, a check is done to determine whether the output of the hall effect sensor is less than a prespecified threshold. In other words, the hall effect sensor estimates if there is enough separation between the winch assembly 108 and the hook assembly 104, through checking the strength of the magnetic field between winch hat 124 and hook assembly 104. If there is not enough separation, the check at block 6004 is repeated until there is enough separation. Upon the determination of enough separation between the winch assembly 108 and hook assembly 104, at block 6012, the drop height value is calculated. The drop height value is the height at which the package is released from the hook assembly based on values from the pressure sensor within hook assembly 104. At block 6016, a current height value is determined based on the current height of the hook assembly 104 as it descends. At block 6020, the difference between the drop height value and the current height value is determined, and if it is greater than a prespecified release height value, servo lock 180 is disengaged from latch 152 and the package is released. If the difference is not greater than a prespecified release height value, the constant current height value is continuously computed at block 6016 and the difference between the current height value and the drop height value is continuously checked at 6020 until it is greater. When the package is successfully released at 6028, the hook landing check is initiated.

Figure 16:
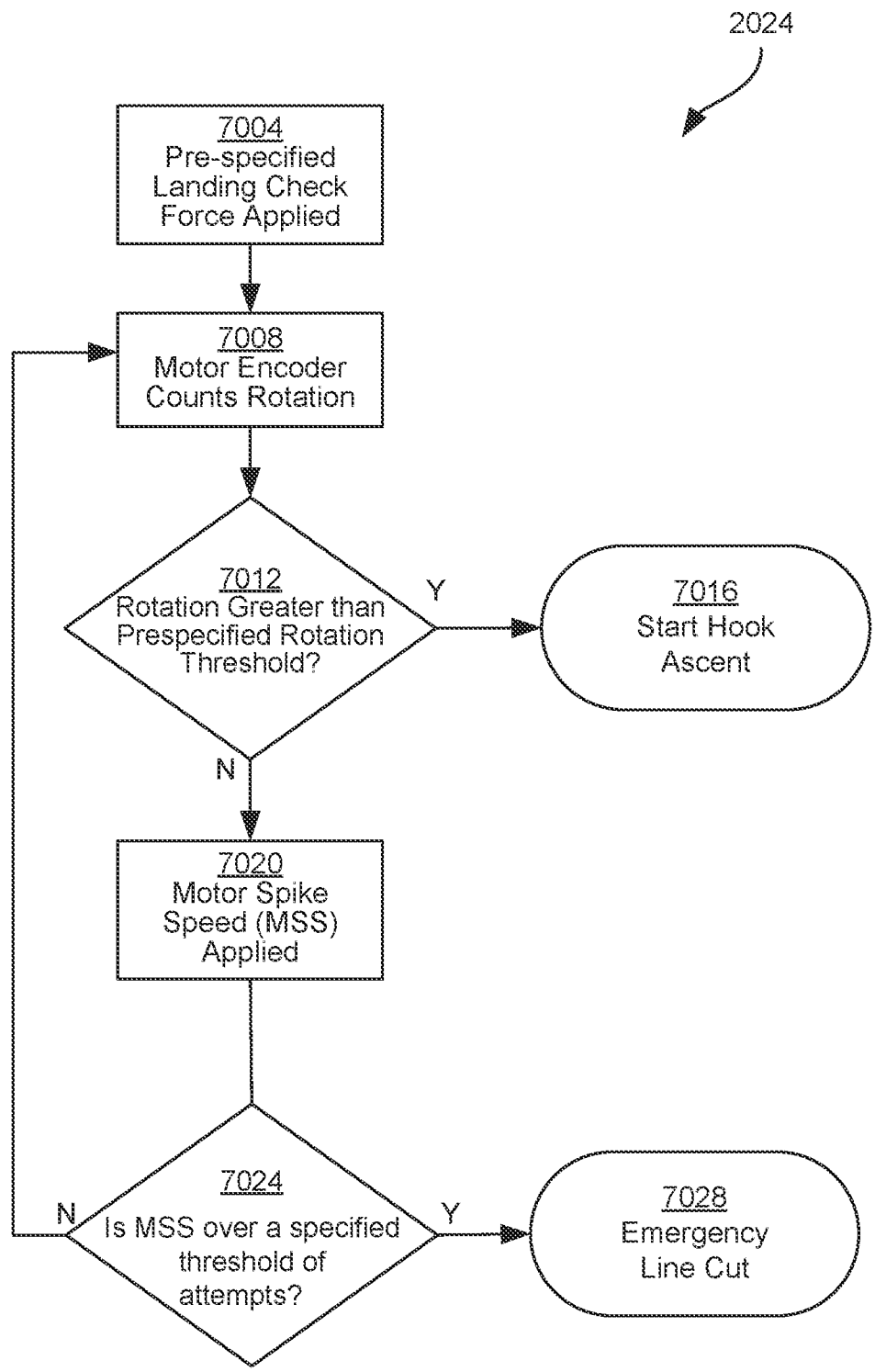
FIG. 16 is a block diagram representing a landing check step of the method by which the winch delivery system operates.

Referring back to FIG. 11, at block 2024, the hook landing check process is initiated upon completion of the hook package release at block 2020. The hook landing check process is required to ensure that the hook assembly 104 has properly released the attached package before starting ascent. The process at block 2024 is depicted in greater detail with reference to FIG. 16, wherein block 2024 is depicted as its own method. At block 7004, motor 160 is configured to apply a pre-specified landing check force in the form of a "pull-up" force. Based on this pre-specified landing check force, the encoder, at block 7008, counts the number of rotations of spool 168 that was the result of the "pull-up force" being applied. At block 7012, if the number of rotations is determined to be greater than a prespecified rotation threshold, then this signals that the package has been successfully released from the hook assembly 104 (in other words, there is no weight preventing the spool from rotating), and, at 7016, the hook ascent process is ready to initiate. However, if at block 7012, it is determined that the number of rotations was less than the prespecified rotation threshold, this indicates that the package was not successfully released from hook assembly 104. Thus, at block 7020, a motor spike speed is applied to the hook assembly 104 to attempt to free the package from hook assembly 104. In other words, the hook assembly 104 attempts to pull the attached package upwards through the applies motor spike speed to free itself. The electronic control unit tracks the number of motor spike speed attempts. At block 7024, the number of motor speed spike attempts is compared to a specified threshold. If the number of motor speed spike attempts is over the specified threshold, at block 7028, the emergency line cut feature is activated (as previously discussed) and the winch line 112 is cut. If the specified threshold of attempts is less than the attempted thresholds, the process is repeated until it is determined that the package has been freed from the hook assembly 104 and, at block 7016, the ascent process may begin.

Figure 17:
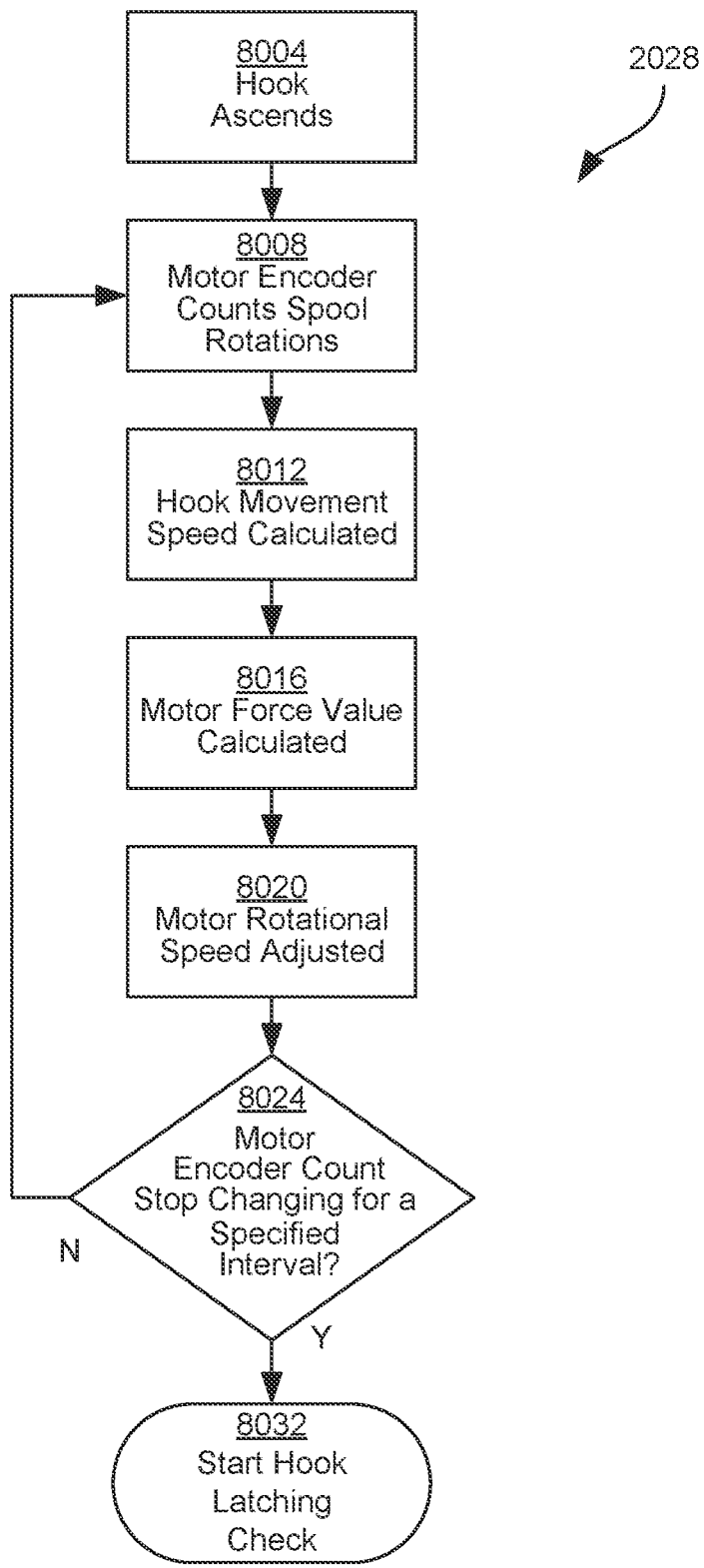
FIG. 17 is a block diagram representing a hook ascent step of the method by which the winch delivery system operates.

Referring back to FIG. 11, at block 2028, the hook ascent process is initiated upon completion of the hook landing check process at block 2024. The hook ascent process is initiated upon delivery of the package to allow the hook assembly 104 to re-latch onto the winch assembly 108. The hook ascent process controls ascent of the hook assembly 104 into winch assembly 108. The process at block 2028 is depicted in greater detail with reference to FIG. 17, wherein block 2028 is depicted as its own method. At block 8004, the hook assembly 104 is ascending due to the force that was applied in the landing check process at block 2024. As hook assembly 104 is descending, at block 8008, the encoder begins to count revolutions of spool 168 as winch line 112 begins to ravel. Each time spool 168 completes one full revolution, a positive one (+1) count is added to a value known as the total encoder value. As the total encoder value is counted by the encoder, at block 8012, a speed monitoring software within the electronic control unit of hook assembly 104 records the updated rate of the encoder in order to calculate the hook movement speed value, which is used to manipulate the speed of the hook movement. The hook speed movement is necessary in order to be able to match the speed of the hook movement to a pre-computed desired hook speed profile, which is a pre-determination of the speed at which the hook assembly 104 should be moving at with respect to the total encoder value. In other words, the hook speed movement value is used to align the speed of hook assembly 104 to a pre-determined desired speed. At block 8016, the speed monitoring software uses the hook movement speed value to determine the motor force value required to apply to the motor 160 to speed up hook assembly 104 to the desired hook speed. The motor force value is applied to the hook at 8020, wherein the motor rotational speed is adjusted via the application of required motor force value. At 8024, there is a check of whether or not the encoder count does not change for a pre-specified landing time duration (such as, for example, about five seconds). If there is no change in the encoder count for the duration of this specified interval, the hook assembly has completely raveled onto winch assembly 108, as spool 168 is no longer moving, and the hook latching check process is ready to begin at block 8028. If there is a change in the encoder count, the process will repeat until it is determined that the hook assembly 104 has completely ascended into winch assembly 108.

Figure 18:
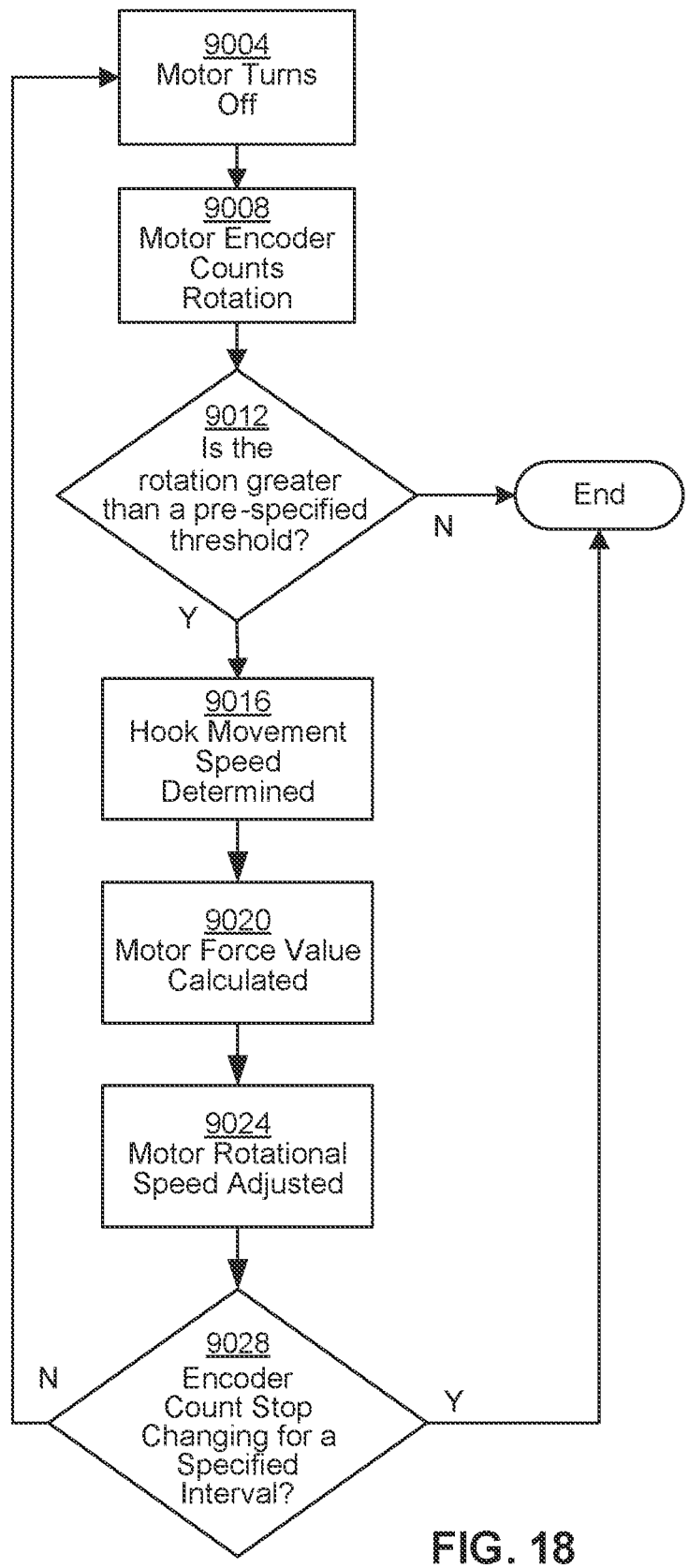
FIG. 18 a block diagram representing a latching check step of the method by which the winch delivery system operates.

Referring back to FIG. 11, at block 2032, the hook latching check process is initiated upon completion of the hook ascent process at block 2028. The hook latching check is undergone to ensure that hook assembly 104 has properly relatched onto winch assembly 108. The process at block 2032 is depicted in greater detail with reference to FIG. 18, wherein block 2032 is depicted as its own method. At block 9004, to initiate the hook latching check, the motor 160 is turned off and solenoid pin 120 is extended to lock the package and secure it. It should be noted that although the solenoid pin 120 is used as the locking mechanism in a preferred embodiment, another mechanism that will occur to those of skill in the art may be used as an alternative locking mechanism, such as a servo motor, for example. At block 9008, the encoder begins to count revolutions of spool 168 to check if winch line 112 is being unraveled. As spool 168 completes one full revolution, a negative one (−1) count is added to a value known as the total encoder value. At block 9012, a check is done to verify whether or not the number of rotations exceeds a prespecified threshold. If the number of rotations does not exceed the pre-specified threshold, this indicates that the hook assembly 104 has latched successfully, and the process ends. If the spool 168 continues to unspool past the prespecified threshold when the motor 160 is turned off, this may indicate that the hook assembly 104 did not latch properly onto winch assembly 108. As the total encoder value is counted by the encoder, the motor 160 is turned on again and the solenoid pin 120 is retracted, and at block 9016, a speed monitoring software within the electronic control unit of hook assembly 104 records the updated rate of the encoder in order to calculate the hook movement speed value, which is used to manipulate the speed of the hook movement. The hook speed movement is necessary in order to be able to match the speed of the hook movement to a pre-computed desired hook speed profile, which is a pre-determination of the speed at which the hook assembly 104 should be moving at with respect to the total encoder value. In other words, the hook speed movement value is used to align the speed of hook assembly 104 to a pre-determined desired speed. At block 9020, the speed monitoring software uses the hook movement speed value to determine the motor force value required to apply to the motor 160 to slow down hook assembly 104 to the desired hook speed. The motor force value is applied to the hook at block 9024, wherein the motor rotational speed is adjusted via the application of required motor force value. At block 9028, there is a check of whether or not the encoder count does not change for a pre-specified latch time duration (such as, for example, about five seconds). If there is no change in the encoder count for the duration of this specified interval, it is presumed that the hook assembly 104 has latched onto winch assembly 108, as spool 168 is no longer moving, and the hook latching check process will begin again to verify that the latch was successful.

Figure 19:
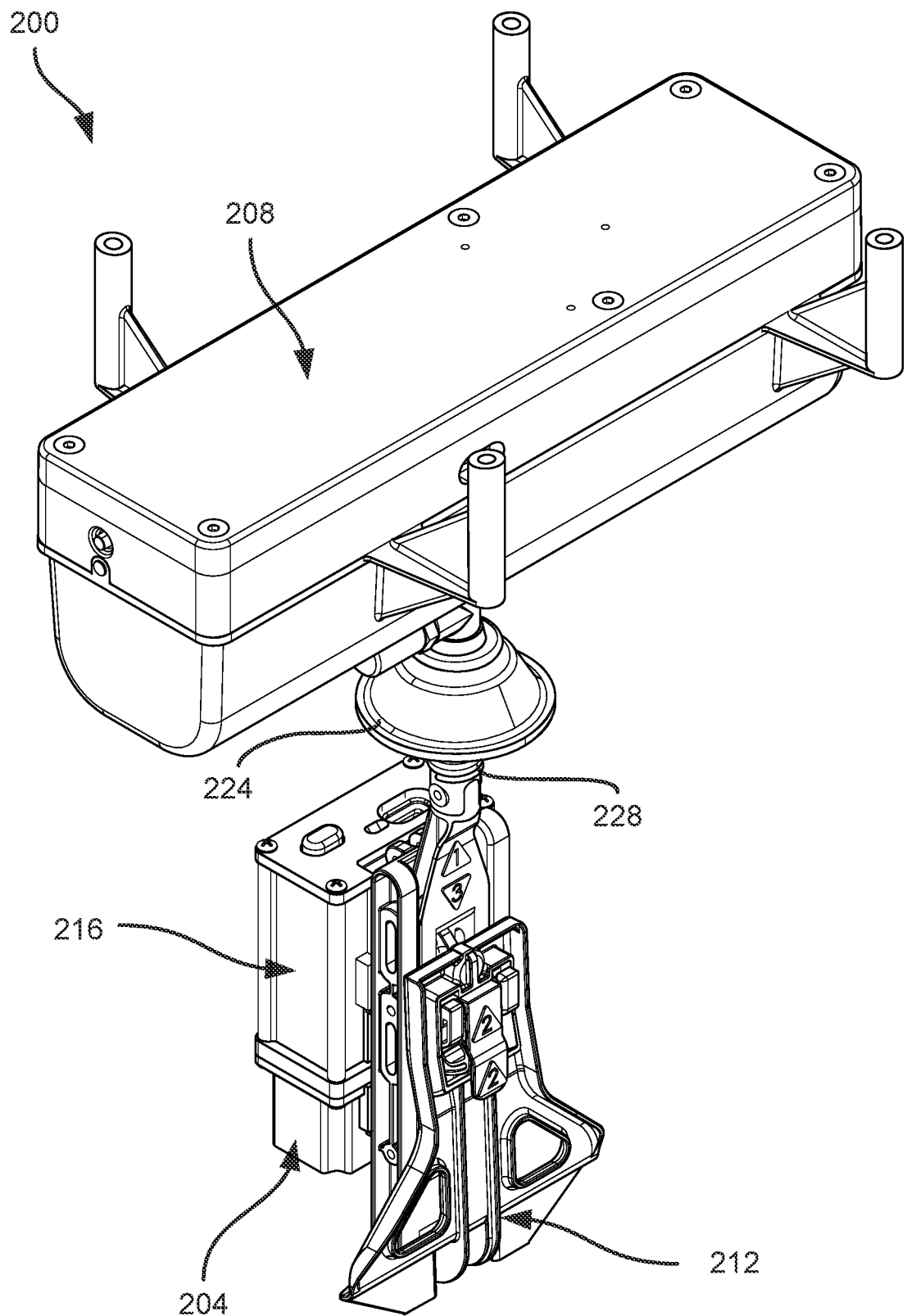
FIG. 19 shows an alternate embodiment of the winch delivery system.
Figure 20:
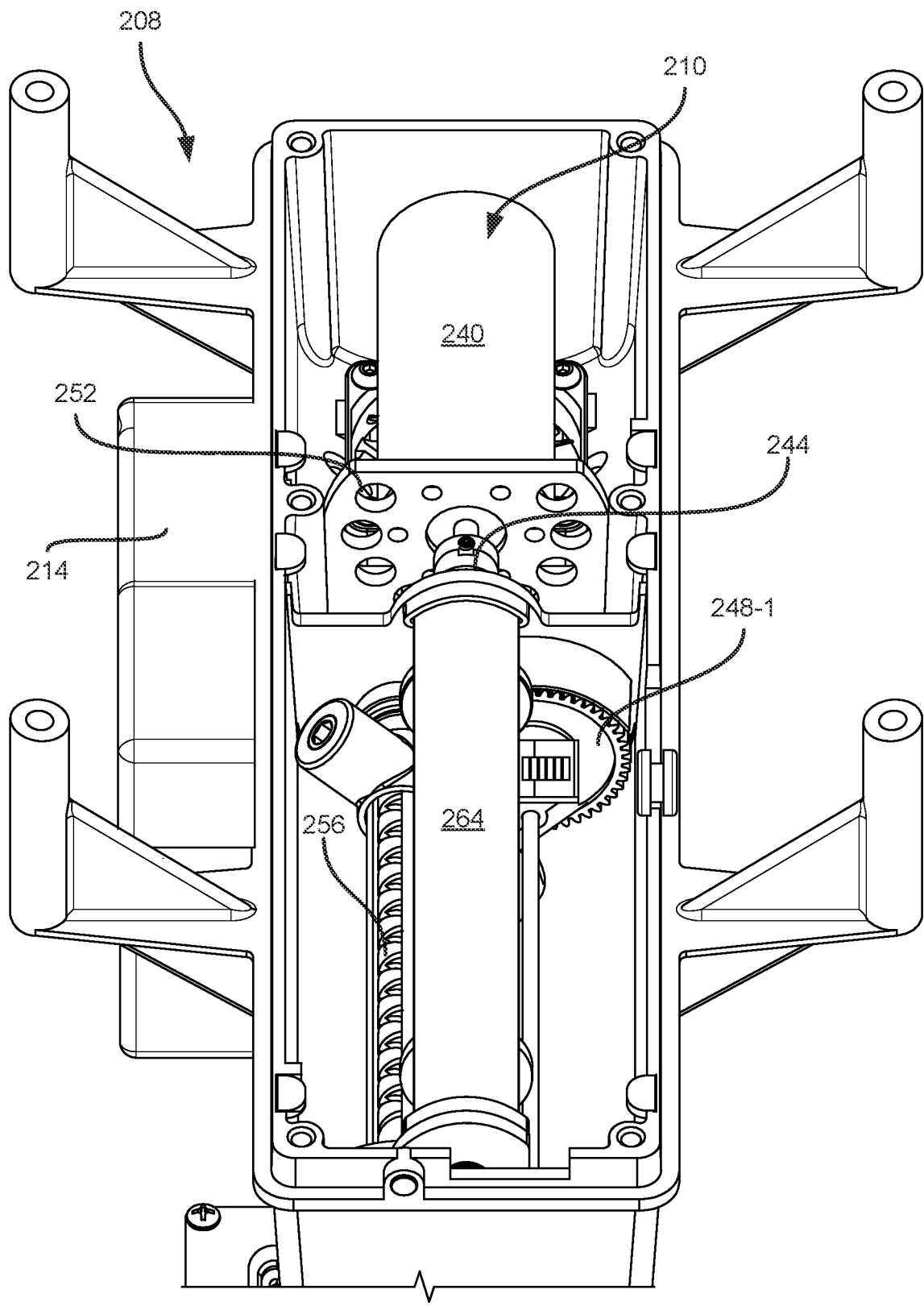
FIG. 20 shows a top view of the interior of a winch assembly of the winch delivery system of FIG. 19 showing an obstructed view of the winch line spool.
Figure 21:
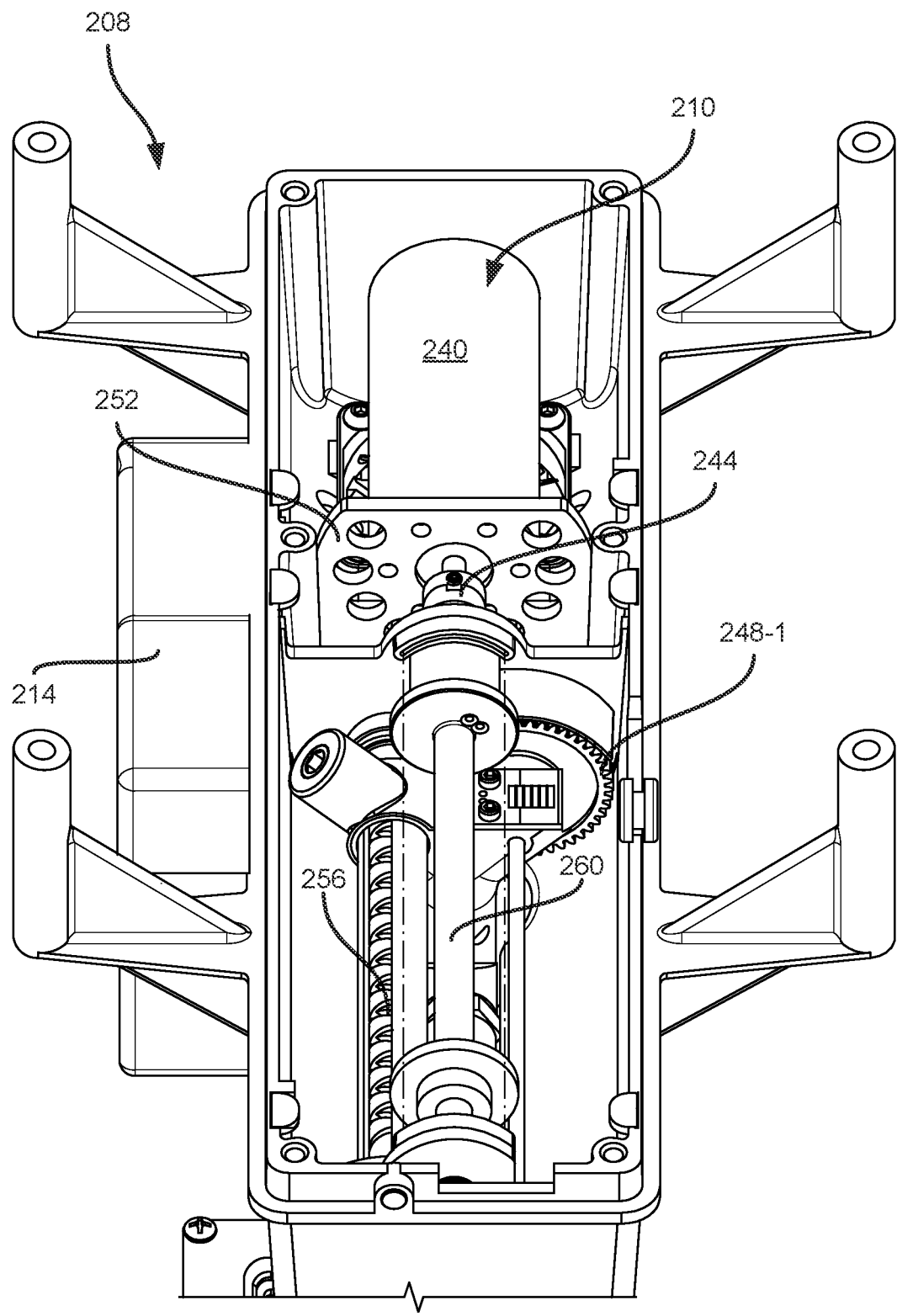
FIG. 21 shows a top view of the interior of a winch assembly of the winch delivery system of FIG. 19.
Figure 22:
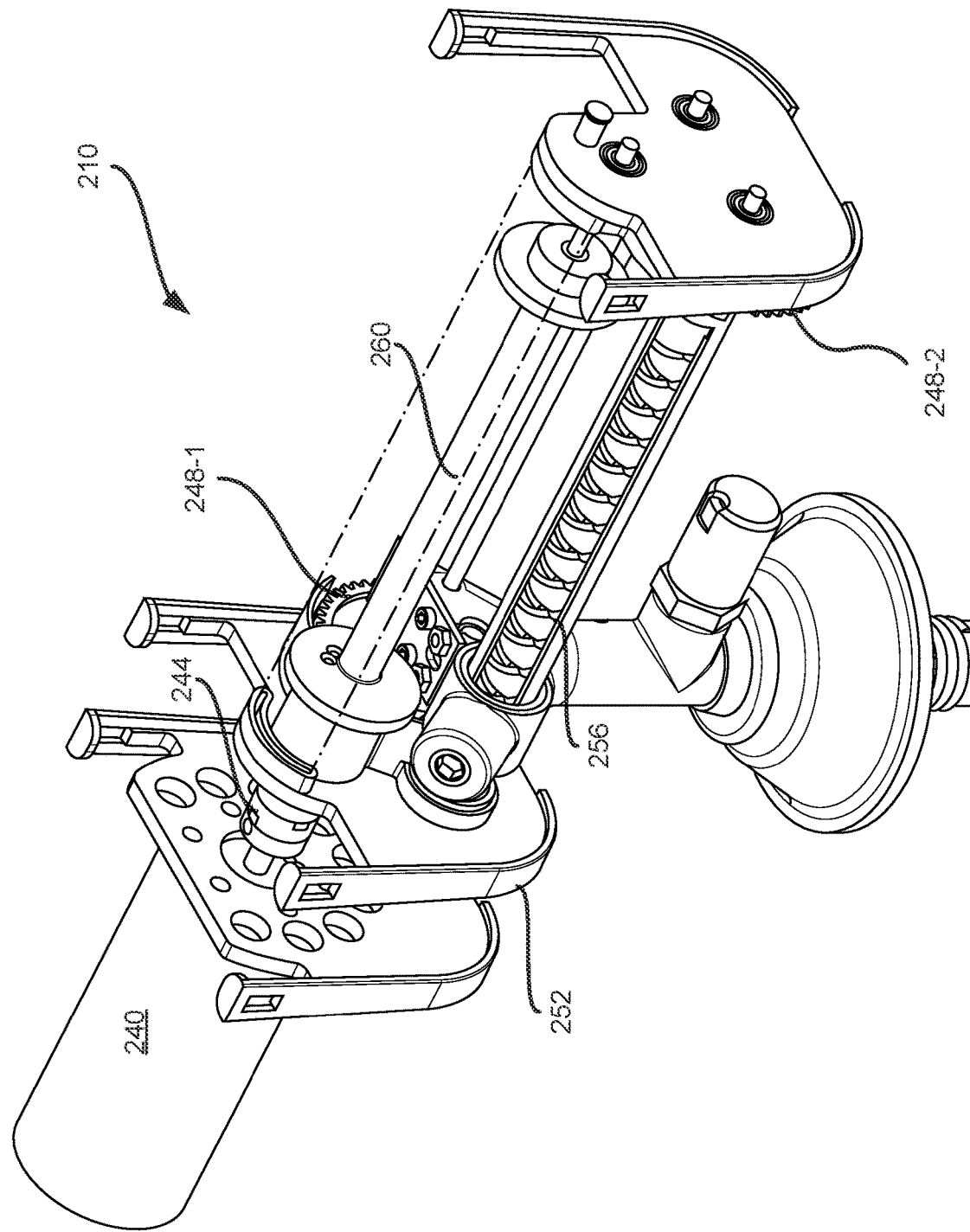
FIG. 22 shows an isometric view of a powertrain of the winch assembly of FIGS. 20 and 21.
Figure 23:
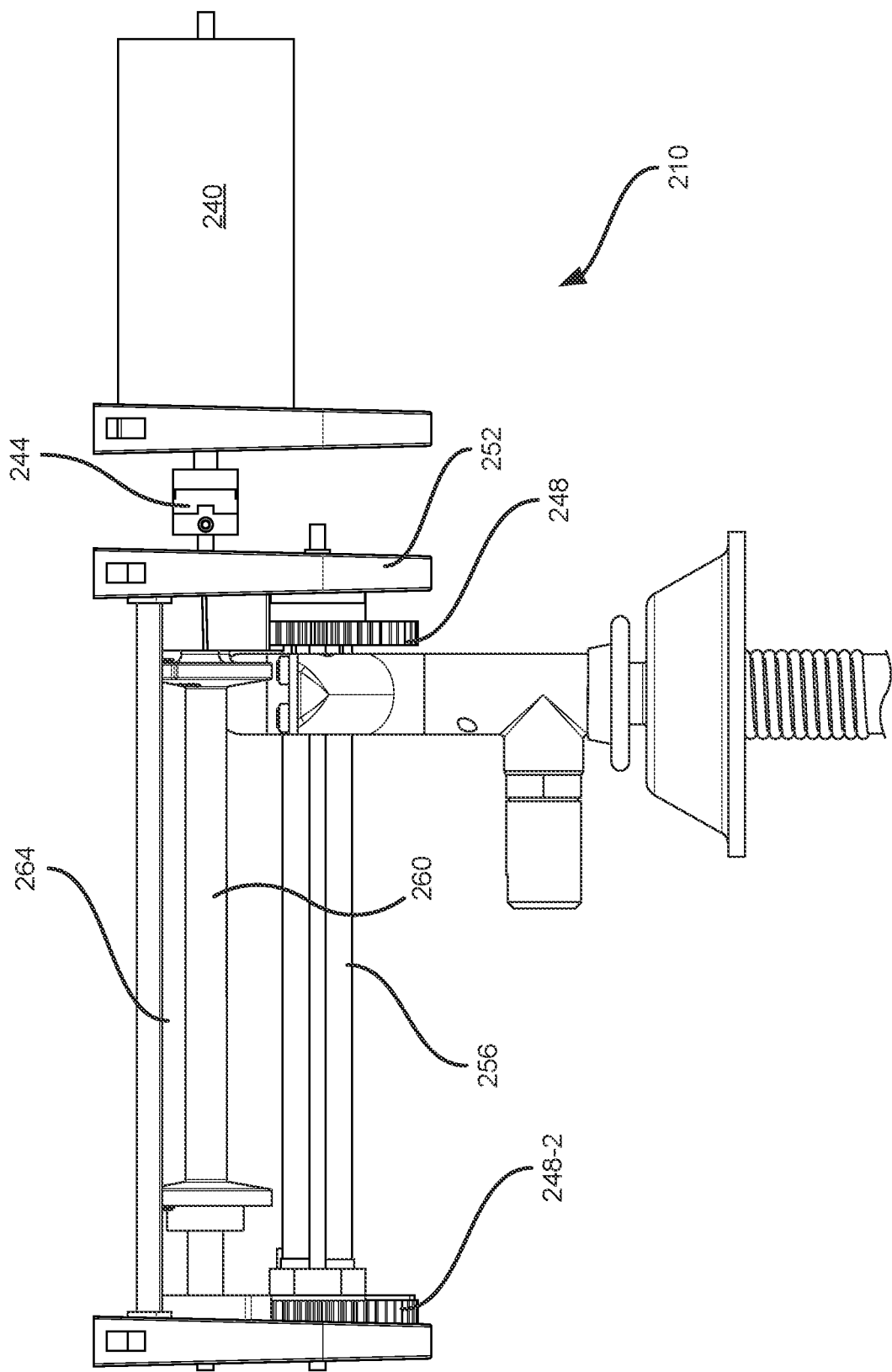
FIG. 23 shows a side view of the powertrain of FIG. 22.

Turning now to FIG. 19, an alternative embodiment of the winch delivery system is depicted at 200. Winch delivery system 200 is essentially the same as winch delivery system 100, comprising of a hook assembly 204 and a winch assembly 208, all being substantially the same as those of winch delivery system 100. Within winch assembly 208 is a powertrain 210 with multiple components that will be discussed further below. The hook assembly 204 comprises a passive hook 212 and a hook backpack 216, with components which are substantially the same as those of winch delivery system 100. In this alternative embodiment, the battery 214 (not shown in FIG. 19) is located on the side of winch delivery system 200. The battery 214 is a lithium polymer battery. The battery 214 has a relatively low mass in relation to winch delivery system 200. For example, the battery 214 may have a mass of between about 40 grams to about 60 grams. In a presently preferred embodiment, the battery 214 has a mass of about 48 grams. In a presently preferred embodiment, battery 214 may have about a 40 Coulomb discharge rate and a capacity of about 800 milliampere hours. The use of a small-sized battery such as battery 214 promotes the lightweight design of winch delivery system 200.

It can also be seen that winch delivery system 200 employs a larger winch hat 224 and a smaller suspension spring 228 as compared to system 100. The use of a larger winch hat 224 can provide optimizations for the hall effect sensor magnet strength or the use of different slider materials and thicknesses. Changes in suspension spring may be used to optimize for desired parcel clearance relative to the ground when the drone is landed and to optimize for desired shock-load absorption.

The powertrain of winch assembly 208 will now be discussed with reference to FIG. 20, FIG. 21, FIG. 22, and FIG. 23. The powertrain is driven by a motor 240. The motor 240 has a relatively low mass in relation to the entire winch delivery system 200. For example, the motor 240 can have a mass of between about 80 grams and about 160 grams. For example, the motor 240 can have a mass of between about 85 grams and about 155 grams. For example, the motor 240 can have a mass of between about 95 grams and about 145 grams. The motor 240 can have a mass of between about 105 grams and about 135 grams.

In a presently preferred embodiment, the motor 240 has a mass of about 95 grams in relation to the winch delivery system which has a mass of about 438 grams in a preferred embodiment. According to the presently preferred embodiment, where the motor is about 95 grams, the motor 240 is about a 9 Volt motor, and operates at about 8 Volts, and at a speed of about 18000 rotations per minute, or about 300 rotations per second and the motor 240 can lift a payload of up to about 1.5 kilograms. The use of a lightweight motor such as motor 240 enables less power draw within winch delivery system 200, as well as a lighter winch delivery system 200 when compared with traditional methods such as a direct drive. This, in turn, enables a greater amount of winch line (not shown) (i.e., up to about 50 to about 55 meters of line in a presently preferred embodiment) that may be used within winch delivery system 200. As depicted in FIG. 20, FIG. 21, FIG. 22, and FIG. 23, the motor 240 is attached to a coupler 244, which may include a clutch. Coupler 244 transmits the torque from motor 240 into an initial gear structure 248. Coupler 244 further has the ability to sever if the torque from motor 240 is too high. The coupler 244 is attached to the gear structure 248-1 through a motor wall 252. As the torque is translated from motor 240 into gear structure 248-1, gear structure 248-1 rotates and this rotation is translated into a linear motion via a reciprocating screw 256. Gear structure further 248-2 aids in the translation of linear motion by providing additional support to reciprocating screw 256. In the present embodiment, reciprocating screw 256 is a worm gear. The reciprocating screw 256 allows the winch line (not shown) to spool evenly across a spool 260, which has a spool cover 264. The use of the reciprocating screw 256 allows for the use of a smaller motor, such as the motor 240, as less power is needed via the motor 240 due to the small diameter of the spool.

The winch delivery system 200 has a relatively low overall mass in relation to known parcel delivery apparatuses which employ direct drives, which generally have a minimum mass of about 1 kilogram to about 1.5 kilograms. Winch delivery system can have a mass of between 300 grams to 600 grams. For example, winch delivery system 200, at a reduced deployment height of about 80 to 85 feet, can have a mass of about 300 grams to 350 grams, with a maximum delivery capacity of about 3 pounds to about 4 pounds. This low mass is facilitated through the use of less winch line, which enables the winch housing to be shorter, thus using less material within the winch delivery system 200. A shorter release height also enables low-weight motors with to be used, as the mass of the spool and the radius of the spool decrease, and therefore, less torque is required. As another example embodiment, at a maximum delivery capacity of about 5 pounds to about 6 pounds and at the highest deployment height of about 150 feet to about 170 feet, the winch delivery system can have a mass of about 500 grams to about 600 grams. In a preferred embodiment, a weight-optimized winch delivery system 200 may have a mass of about 400 grams to about 440 grams, wherein the highest deployment height is about 160 feet to about 170 ft, with a delivery capacity of about 2 pounds to about 3 pounds.

In the foregoing specification, specific embodiments have been described. However, one of ordinary skill in the art will now appreciate that various modifications and changes can be made without departing from the scope of the invention as set forth in the claims below. Accordingly, the specification and figures are to be regarded in illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Embodiments of the winch delivery systems of the present specification, as described as presently preferred or the variants thereof, can thus carry a range of payload weights and can be used on different drones, with means of using the winch on different types of drones. Embodiment of the present specification also can provide a combination of active and passive release mechanisms. Winch delivery systems according to the present specification are relatively lightweight and do not require heavy-lift drones greater than about 30 lbs. Maximum Take-Off (MTOW) weight in order to carry a commercially meaningful amount of delivery payload. Thus, while the present specification can have application to providing winch delivery systems for all sizes of drones, it can have particular application to drones of about 30 lbs. MTOW, and more particularly to drones of between about 10 lbs. MTOW and about 30 lbs. MTOW, and between about 15 lbs. MTOW and about 25 lbs. MTOW. Furthermore, the winch delivery systems of the present specification do not necessarily require the drone to deploy the payload from a height close to the ground such that the drone has a greater likelihood to endanger persons or property.

In certain embodiments, the presently described winch delivery system is advantageously formed as a lightweight winch delivery system through the use of a lightweight motor. A lightweight motor advantageously allows for a longer winch line to be used within the winch delivery system. This is made possible through the use of a reciprocating screw. A reciprocating screw allows for the winch line to be evenly wrapped along a spool that has a long length with a relatively small diameter. Due to the torque requirements to rotate a spool being linearly correlated with the radius of such a spool, a long spool with a small diameter allows for relatively low torque and lightweight motor to be used. Lower torque requirement can allow for additional weight savings as well, such as gears and batteries, leading to cascading weight savings.

A further advantage of certain embodiments of the presently described winch delivery system is the ability for a drone to safely deliver a parcel from greater heights even under aggressive wind conditions, with the delivery height only limited by the length of line contained in the winch. This is made possible through the use of a combined active and passive hook mechanism that can prevent the package from unintentionally falling off the hook due to aerodynamic forces and wind when the hook is transiting down from the drone's hovering altitude to the ground. The active and passive hook combination can allow for greater drone hovering height during delivery as the parcel can remain secure during the descent even if there is high variability in the hook descent rate or aggressive wind conditions.

A further advantage of certain embodiments of presently described winch delivery system is tolerance to the shock-load of a parachute deployment. A common regulatory requirement for a drone to satisfy for flying over people is that the parcel remains attached to the drone during the deployment of a safety parachute. This can be made possible through a drivetrain design that bears the shock-load on a solenoid pin and through the use of a hook suspension spring that dissipates kinetic energy. The drivetrain design and the use of the suspension spring in the hook design can allow for a parcel to remain attached to the drone after experiencing the shock-load of a parachute deployment.

A further advantage of certain embodiments of presently described winch delivery system may be found in the method of securing the parcel during drone transit and during a parachute deployment, which may be entirely self-contained and does not necessarily require extensive structural modifications to the drone. The presently described winch delivery system can provide the aforementioned capabilities without the need to modify a drone's airframe such as with a box to cover the entirety of the parcel. The winch delivery system can thus be readily transferred onto other drone designs with minimum modifications. A further advantage of the certain embodiments is that while the hook is dropping, the gravitational force can translate into rotational energy of the motor and cause the battery to charge.

The scope of the claims should not be limited by the embodiments set forth in the above examples but should be given the broadest interpretation consistent with the description as a whole.

What is claimed is:

1. A winch delivery system for connection to an underside of a drone, the winch delivery system comprising:
    a housing including a control unit and an attachment mechanism for connection to the drone;
    a motor within the housing for generating a rotational force at first speed;
    a gear assembly within the housing connected to the motor for translating the first speed into a second speed lower than the first speed;
    a reciprocating screw within the housing connected to the motor via the gear structure for rotation at the second speed;
    a spool in direct rotational communication with the motor for rotation at the first speed;
    a winch line with a first end and a second end; the first end connected to the spool for winding the winch line evenly around the spool as guided by the reciprocating screw; the second end extending from the housing and for connecting to a payload;
    a hook assembly connected to the second end of the winch line, the hook assembly including a jaw for releasably carrying a parcel;
    a solenoid pin in a slider for locking and releasing the hook assembly; and,
    a glow wire embedded in the slider, wherein the control unit allows the glow wire to burn and cuts the line in the event of malfunction.

2. The winch delivery system of claim 1 further comprising a slider for reciprocating along the length of the reciprocating screw; the slider having a channel for guiding the line along the length of the spool during winding.

3. The winch delivery system of claim 1 further comprising a control unit for detecting altitude.

4. The winch delivery system of claim 1, wherein the mass of the winch delivery system is about 400 grams to about 440 grams.

5. The winch delivery system of claim 1, wherein the mass of the motor is between about 95 grams to about 145 grams.

6. The winch delivery system of claim 1, wherein the hook assembly further includes a servo lock which disengages when the control unit detects that ground has almost been reached.

7. The winch delivery system of claim 6, further comprising a latch that pivots when the servo lock disengages.

8. The winch delivery system of claim 1, further comprising a cylindrical magnet on the slider to detect when the hook assembly is near the winch.

9. The winch delivery system of claim 1 further comprising a hook bell having a conical shape to allow the hook bell to be locked against the solenoid pin in the slider.

10. The winch delivery system of claim 9, wherein the hook bell is attached to a circuit that detects the magnetic field of a magnet on the slider.

11. The winch delivery system of claim 1, wherein the hook assembly further comprises a rotating jaw with an embedded magnet and a hook electronics board with an inertial measurement unit.

12. The winch delivery system of claim 1, wherein the spool is interchangeable.

* * * * *